US011057609B2

(12) United States Patent
Yoneda et al.

(10) Patent No.: US 11,057,609 B2
(45) Date of Patent: Jul. 6, 2021

(54) INFORMATION PROCESSING APPARATUS, INFORMATION PROCESSING METHOD, AND COMPUTER READABLE STORAGE MEDIUM FOR DETERMINING A MOVING PATH OF VIRTUAL VIEWPOINT

(71) Applicant: CANON KABUSHIKI KAISHA, Tokyo (JP)

(72) Inventors: Keigo Yoneda, Yokohama (JP); Michio Aizawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/784,731

(22) Filed: Feb. 7, 2020

(65) Prior Publication Data

US 2020/0275083 A1    Aug. 27, 2020

(30) Foreign Application Priority Data

Feb. 27, 2019  (JP) .............................. JP2019-034200
Mar. 4, 2019   (JP) .............................. JP2019-038764

(51) Int. Cl.
*H04N 13/279*  (2018.01)
*H04N 13/282*  (2018.01)
*G06T 19/00*   (2011.01)

(52) U.S. Cl.
CPC ......... *H04N 13/279* (2018.05); *G06T 19/003* (2013.01); *H04N 13/282* (2018.05)

(58) Field of Classification Search
CPC .............. H04N 13/279; H04N 13/282; H04N 21/4728; H04N 13/167; H04N 13/117; G06T 19/003; G11B 27/11

USPC .......................................................... 348/51
See application file for complete search history.

(56) References Cited

U.S. PATENT DOCUMENTS

| 6,417,853 | B1 * | 7/2002 | Squires ................... G06T 13/80 345/473 |
| 10,681,337 | B2 * | 6/2020 | Masuda ................. H04N 7/181 |
| 2012/0141016 | A1 * | 6/2012 | Wildeboer ........... H04N 13/271 382/154 |
| 2018/0246631 | A1 * | 8/2018 | Maruyama ........... H04N 13/282 |
| 2018/0359458 | A1 * | 12/2018 | Iwakiri ................ H04N 13/117 |

(Continued)

FOREIGN PATENT DOCUMENTS

JP           2007025979 A      2/2007

*Primary Examiner* — Susan E. Hodges
(74) *Attorney, Agent, or Firm* — Rossi, Kimms & McDowell LLP

(57) ABSTRACT

An information processing apparatus sets a plurality of key frames that each indicate a position of a virtual viewpoint that corresponds to a virtual viewpoint image, the plurality of key frames corresponding to different times, the virtual viewpoint image being generated based on images of an image capture region captured by a plurality of image capturing apparatuses from different directions. The information processing apparatus determines, based on a position of a virtual viewpoint indicated by a set first key frame and a position of a virtual viewpoint indicated by a set second key frame, a moving path of the virtual viewpoints during a time period between time that corresponds to the first key frame and time that corresponds to the second key frame, and outputs viewpoint information that indicates the determined moving path of the virtual viewpoints.

20 Claims, 21 Drawing Sheets

(56) References Cited

U.S. PATENT DOCUMENTS

2019/0112165 A1* 4/2019 Palberg ................ B66C 13/063
2019/0163356 A1* 5/2019 Hanamoto .......... G06F 3/04815

* cited by examiner

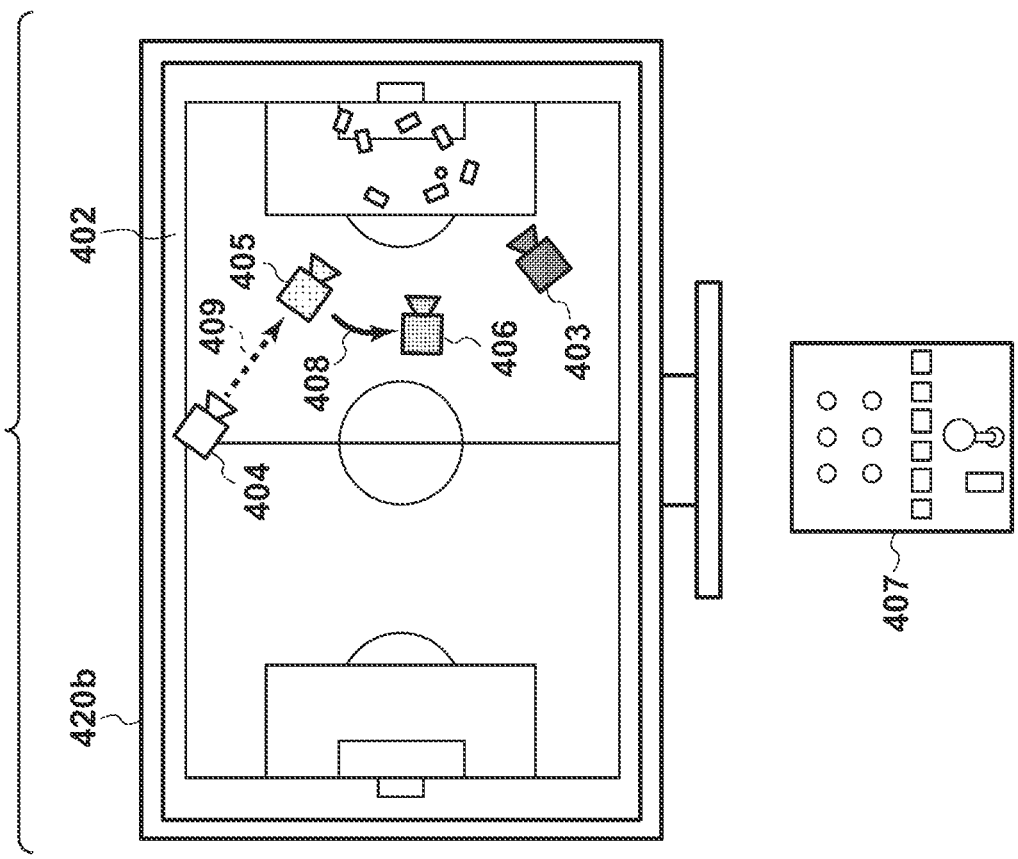
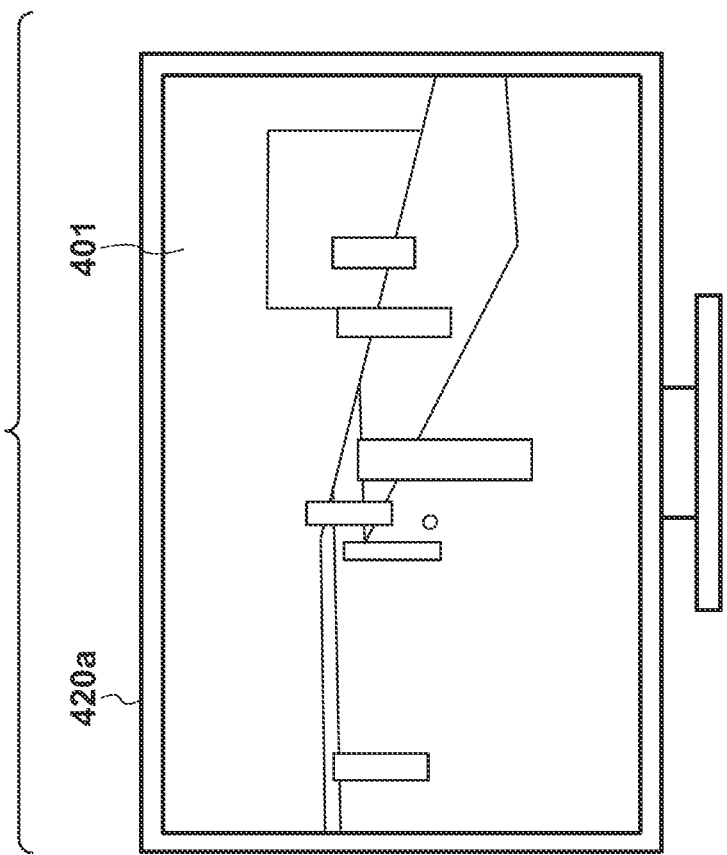

INFORMATION PROCESSING APPARATUS, INFORMATION PROCESSING METHOD, AND COMPUTER READABLE STORAGE MEDIUM FOR DETERMINING A MOVING PATH OF VIRTUAL VIEWPOINT

BACKGROUND OF THE INVENTION

Field of the Invention

The present invention relates to a technique for setting a virtual viewpoint.

Description of the Related Art

A virtual viewpoint image generation technique is known as a technique for reproducing, using images captured by a plurality of actual cameras, an image from a viewpoint (virtual viewpoint) of a camera that is virtually arranged within a three-dimensional space and does not actually exist. Camera parameters, which are a type of viewpoint information regarding a virtual viewpoint and are necessary for generating a virtual viewpoint image, are set by an operator inputting a moving direction, orientation, rotation, a moving distance, and a moving speed of the virtual viewpoint using a UI screen and a controller such as a joystick.

Japanese Patent Laid-Open No. 2007-025979 discloses that a key frame method is used as a method for displaying animation using three-dimensional computer graphics. In the key frame method, an intermediate frame between key frames, which designate a key display state, is automatically interpolated via a spline function.

As described above, by operating the joystick or the like to change the position and orientation of the virtual viewpoint, the operator can move the virtual viewpoint on a suitable path (camera path) and capture a virtual viewpoint image from the moving virtual viewpoint. However, when setting a camera path by operating the joystick or the like, it is difficult for the operator to set a virtual viewpoint that has a desired position and orientation at desired time (frame). Currently, no technique for supporting generation of such a camera path has been proposed.

A key frame method using three-dimensional computer graphics as disclosed in Japanese Patent Laid-Open No. 2007-025979 aims to render an image of an intermediate frame between key frames using interpolation with a spline function, and does not aim to generate a path of a virtual camera. Furthermore, Japanese Patent Laid-Open No. 2007-025979 discloses a time-line object indicating an elliptical orbit on which a virtual camera is moved, but the path (orbit) of the virtual camera cannot be freely set by a user.

The present invention provides a technique with which it is possible to easily generate a desired camera path for use in generating a virtual viewpoint image.

SUMMARY OF THE INVENTION

According to one aspect of the present invention, there is provided an information processing apparatus comprising: a setting unit configured to set a plurality of key frames that each indicate a position of a virtual viewpoint that corresponds to a virtual viewpoint image, the plurality of key frames corresponding to different times, the virtual viewpoint image being generated based on images of an image capture region captured by a plurality of image capturing apparatuses from different directions; a determination unit configured to determine, based on a position of a virtual viewpoint indicated by a first key frame set by the setting unit and a position of a virtual viewpoint indicated by a second key frame set by the setting unit, a moving path of virtual viewpoints during a time period between time that corresponds to the first key frame and time that corresponds to the second key frame; and an output unit configured to output viewpoint information that indicates the moving path of the virtual viewpoints determined by the determination unit.

According to another aspect of the present invention, there is provided an information processing method comprising: setting a plurality of key frames that each indicate a position of a virtual viewpoint that corresponds to a virtual viewpoint image, the plurality of key frames corresponding to different times, the virtual viewpoint image being generated based on images of an image capture region captured by a plurality of image capturing apparatuses from different directions; determining, based on a position of a virtual viewpoint indicated by a set first key frame and a position of a virtual viewpoint indicated by a set second key frame, a moving path of virtual viewpoints during a time period between time that corresponds to the first key frame and time that corresponds to the second key frame; and outputting viewpoint information that indicates the determined moving path of the virtual viewpoints.

According to another aspect of the present invention, there is provided a non-transitory computer readable storage medium storing a program for causing a computer to execute the information processing method comprising: setting a plurality of key frames that each indicate a position of a virtual viewpoint that corresponds to a virtual viewpoint image, the plurality of key frames corresponding to different times, the virtual viewpoint image being generated based on images of an image capture region captured by a plurality of image capturing apparatuses from different directions; determining, based on a position of a virtual viewpoint indicated by a set first key frame and a position of a virtual viewpoint indicated by a set second key frame, a moving path of virtual viewpoints during a time period between time that corresponds to the first key frame and time that corresponds to the second key frame; and outputting viewpoint information that indicates the determined moving path of the virtual viewpoints.

Further features of the present invention will become apparent from the following description of exemplary embodiments with reference to the attached drawings.

BRIEF DESCRIPTION OF THE DRAWINGS

FIGS. 4A and 4B are diagrams illustrating a UI screen for editing a camera path.

DESCRIPTION OF THE EMBODIMENTS

Figure 1:
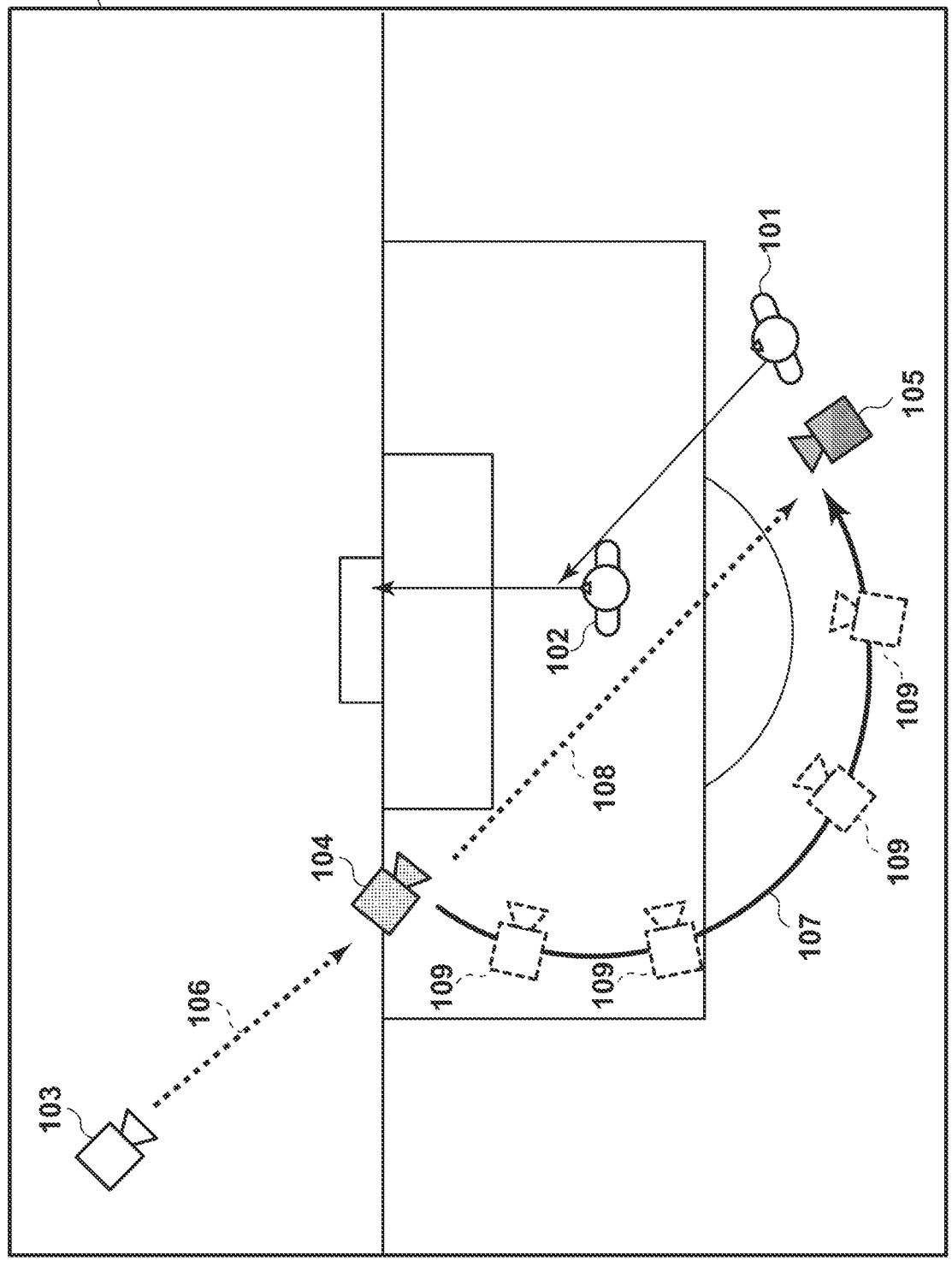
FIG. 1 is a diagram illustrating camera parameter interpolation according to a key frame method.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

The following embodiments disclose configurations in which a plurality of key frames, serving as references that correspond to different times, are selected, a desired virtual viewpoint (position/orientation) is set for each of the selected plurality of key frames, and positions and orientations of virtual viewpoints between the plurality of key frames are determined using interpolation with a spline function or the like.

If interpolation is uniformly performed between the key frames, there are cases where a virtual viewpoint path intended by a user cannot be easily set. For example, if a camera path is generated that indicates an arc-shaped moving path such that the positions of the virtual viewpoints are located on an arc of nearly 180 degrees around an object, interpolation with a spline function will require to designate multiple key frames on the arc serving as the camera path. Accordingly, it takes time and effort for an operator to designate the key frames. Embodiments 1 to 3 disclose configurations in which, in order to also solve the aforementioned problems, an appropriate interpolation method is selected.

Moreover, when setting a camera path indicating movement of virtual viewpoints relating to a virtual viewpoint image, a user can designate time and virtual viewpoints (positions and orientations) of key frames to easily set the camera path. In this case, the moving speed of the viewpoints on the camera path depends on the time interval between the designated plurality of key frames and the amount of movement of the viewpoints. However, depending on the relationship of the plurality of key frames designated by the user, the moving speed of the viewpoints largely varies between before and after the key frames, and thus a virtual viewpoint image obtained based on the camera path is unnatural. Embodiment 4 discloses a configuration in which it is possible to easily set the movement of virtual viewpoints for use in generating a virtual viewpoint image with reduced unnaturalness and reduced feeling of strangeness. Hereinafter, the embodiments will be described.

Embodiment 1

Embodiment 1 will describe processing for determining, based on parameters (hereinafter, referred to as "camera parameters") that define virtual viewpoints of key frames serving as references, a method for interpolating camera parameters between the key frames. Note that, in the present embodiment, a virtual viewpoint defined by a camera parameter may be explained using a term "virtual camera", for ease of description. The position of a virtual camera corresponds to the position of a virtual viewpoint, the orientation of the virtual camera corresponds to the orientation of the virtual viewpoint, and the zoom (focal length) of the virtual camera corresponds to a zoom parameter of the virtual viewpoint.

"Virtual viewpoint image" refers to an image that is generated based on the position, the orientation, and the like of a virtual camera, which is different from an actual camera. For example, an image capturing system (not shown) includes a plurality of cameras, serving as image capturing apparatuses, that are disposed at different positions in a stadium in which a soccer game is taking place, and the plurality of actual cameras synchronously capture images of the field, which serves as an image capture region, from a plurality of different viewpoints. Based on image data of the images of the plurality of viewpoints obtained as a result of the plurality of actual cameras of the image capturing system having performed synchronous image capture, a virtual viewpoint image is generated that is viewed from a viewpoint of a non-existent camera (virtual camera) different from any of the actual cameras of the image capturing system. Note that the virtual camera may be controlled using a manual operation of an end user, a special operator, or the like, an automatic operation that corresponds to details of content, an automatic operation based on a predetermined fixed camera path, and the like. Furthermore, the following description will be given assuming that a virtual viewpoint image is a video, but the virtual viewpoint image may also be a still image.

Description of Key Frame Method

The following will describe a key frame method, which is a method for generating camera parameters indicating a virtual viewpoint path (camera path). In the key frame method, first, key frames are designated that correspond to virtual viewpoints that are included in a camera path and serves as references. Upon designation of the key frames, one or more camera parameters for connecting the key frames are generated using interpolation with a spline function or the like. The camera path indicated with the one or more camera parameters generated using interpolation serves as a camera path that smoothly connects the key frames. Accordingly, a virtual viewpoint image with the camera parameters generated through the key frame method can have less camera shake and smoother movement than an image obtained in a case where an operator operates a controller to directly designate a camera path. Therefore, a virtual viewpoint image in sports such as soccer that is generated through the key frame method can give a viewer the feeling of being actually there.

FIG. 1 is a diagram illustrating an example of a UI (user interface) screen for editing a camera path that is obtained such that virtual cameras, which indicate the positions and orientations of virtual viewpoints, and camera paths of the virtual cameras are superimposed on a view of a soccer shoot scene that is viewed above the heads of players. An example of application of the present embodiment will be described with reference to FIG. 1. The shoot scene shown in FIG. 1 is a scene in which a ball is passed by a player 101 to a player 102, and the player 102 shoots the ball to score a goal. A case is taken in which a virtual viewpoint image is generated with following camera movement such that the shoot scene is captured mainly with the player 102 from the position of a virtual camera 103 on the goal side, and then the virtual camera is moved to the position of a virtual camera 104 while approaching the player 102 to capture the shoot scene. Lastly, the virtual camera is moved to the position of a virtual camera 105, the virtual camera 105 is panned to capture the back of the player 102 and the shoot scene.

It is assumed that camera parameters indicated by the virtual camera 103, the virtual camera 104, and the virtual camera 105 are designated as key frames, and a camera path between the key frames is generated using interpolation of camera parameters by means of a key frame method.

At this time, an operator expects that the camera path from the virtual camera 103 to the virtual camera 104 is a straight camera path 106, and the camera path from the virtual camera 104 to the virtual camera 105 is a camera path 107 on which the virtual camera moves in an arc shape around the player.

According to spline interpolation using a spline function, which is one of interpolation methods for connecting key frames, if there are two key frames, camera parameters are generated that define a straight camera path between the key frames. Accordingly, the camera parameters from the virtual camera 103 to the virtual camera 104 are preferably generated using spline interpolation.

However, if the spline interpolation is used, camera parameters will be generated that define, as the camera path from the virtual camera 104 to the virtual camera 105, instead of the arc-shaped camera path 107, a straight camera path 108. In order to generate camera parameters that define the arc-shaped camera path 107 using the spline interpolation, it is necessary for an operator themselves to designate, as key frames, a plurality of camera parameters indicated by a virtual camera 109 on the camera path 107 expected by the operator. Accordingly, it takes time and effort for the operator.

On the other hand, according to an interpolation method using circular interpolation, an arc-shaped camera path that passes through the key frames is generated. Accordingly, if circular interpolation is used as the camera parameter interpolation method, camera parameters that define movement on the camera path 107 can be generated, only by designating the camera parameters indicated by the virtual camera 104 and the virtual camera 105, as key frames.

In the present embodiment, an interpolation method determination unit 315 (see FIG. 3) determines an appropriate interpolation method with reference to camera parameters designated as key frames. Also, the interpolation method includes circular interpolation. Accordingly, in the present embodiment, the operator does not need to designate multiple virtual cameras 109. Accordingly, a reduction in the number of virtual cameras to be designated as key frames can diminish the burden of the operator. The processing for determining an interpolation method that is performed by the interpolation method determination unit 315 will be described in detail later.

Hardware Configuration

Figure 2:
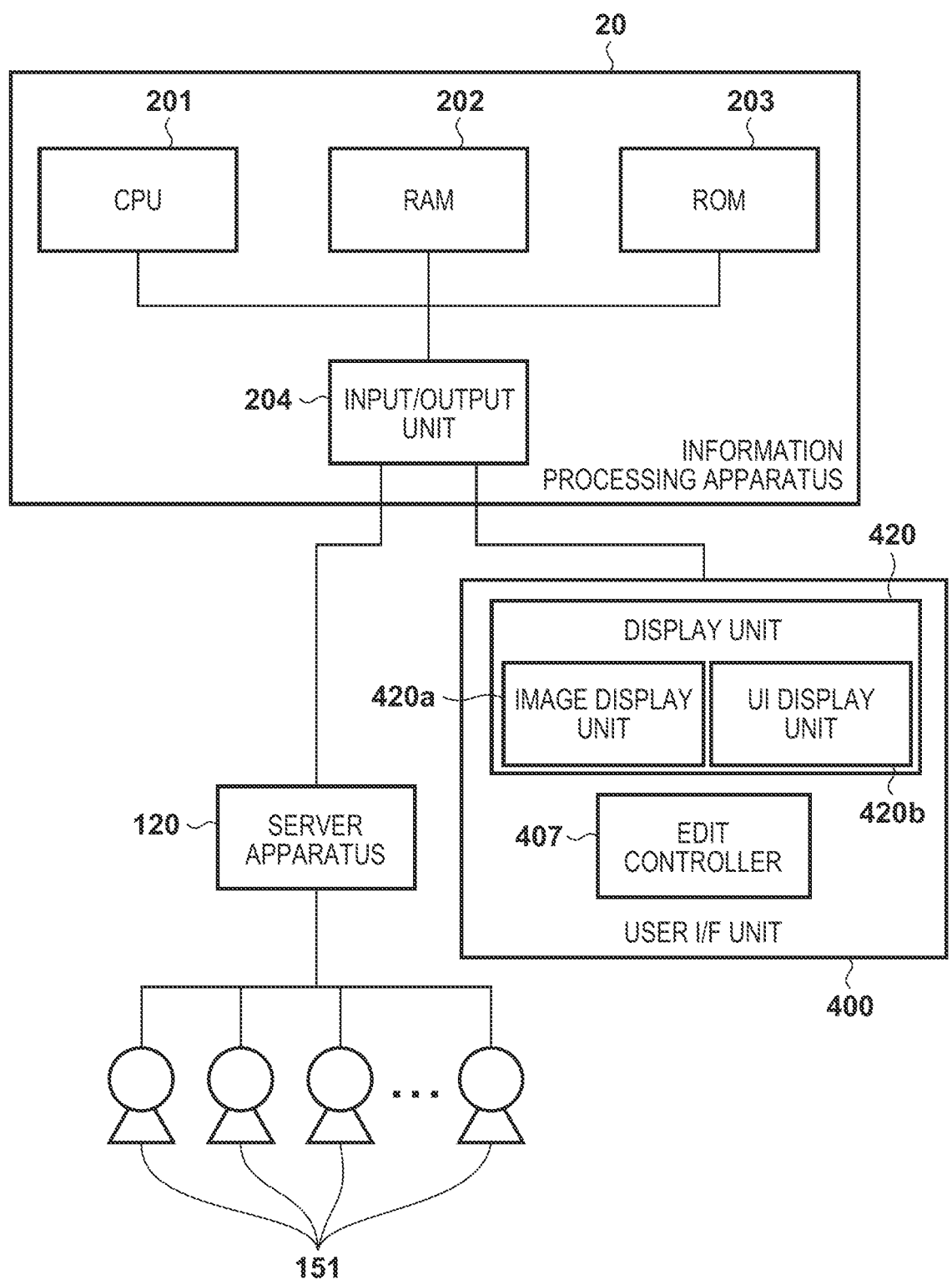
FIG. 2 is a diagram illustrating an example of a configuration of an image capturing system, and a hardware configuration of an information processing apparatus.

FIG. 2 is a diagram illustrating an example of a configuration of the image capturing system according to the present embodiment. The image capturing system includes an information processing apparatus 20, a server apparatus 120, a plurality of actual cameras 151, and a user I/F unit 400. The server apparatus 120 is connected to the plurality of actual cameras 151 and the information processing apparatus 20, and is configured to collect and store captured images obtained by the plurality of actual cameras 151 synchronously capturing images, and provide the captured images to the information processing apparatus 20. FIG. 2 further shows an example of a hardware configuration of the information processing apparatus 20 that can edit a camera path in a virtual viewpoint image according to the present embodiment. The information processing apparatus 20 of the present embodiment includes a CPU 201, a RAM 202, a ROM 203, and an input/output unit 204.

Figure 3:
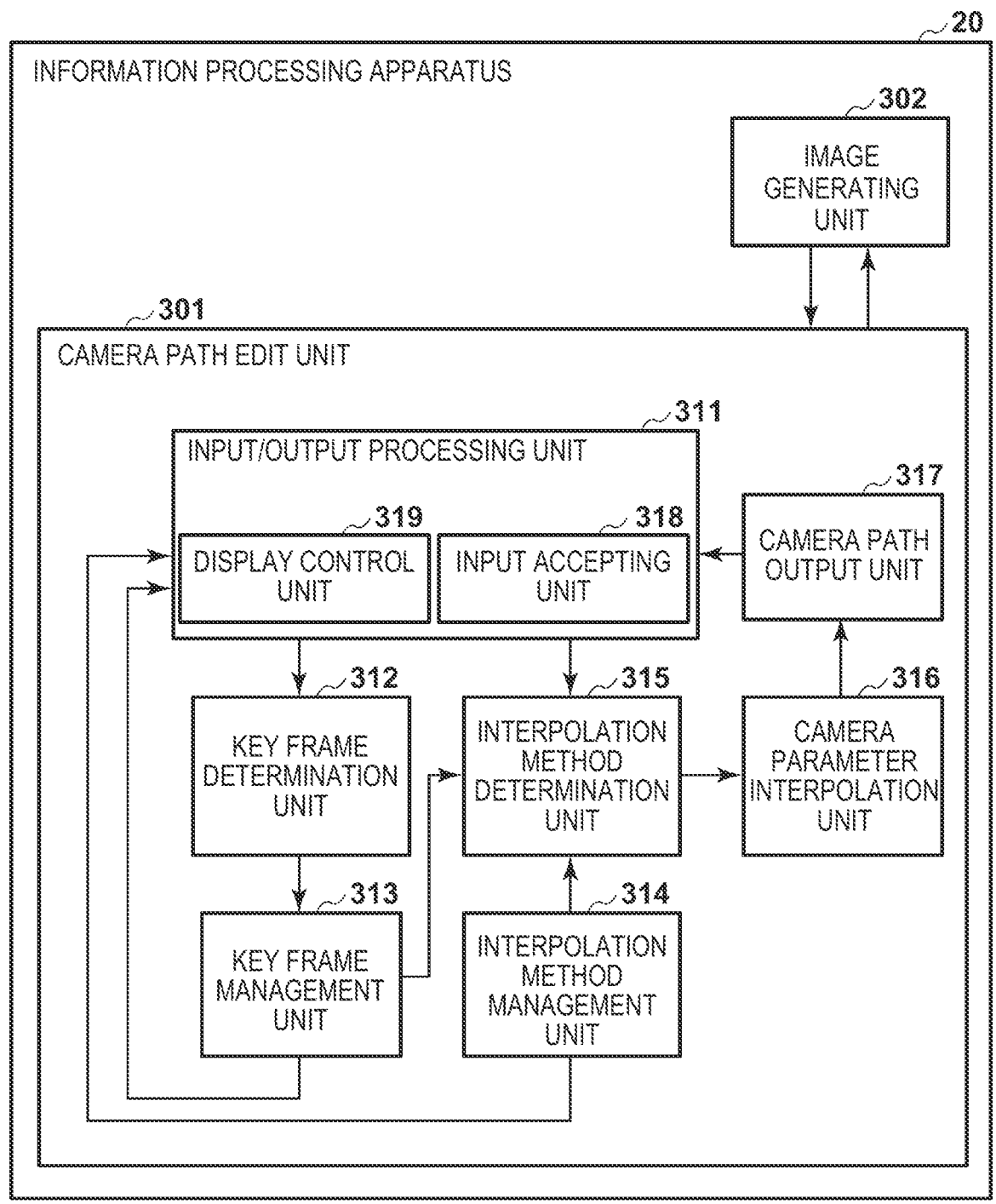
FIG. 3 is a diagram illustrating an example of a functional configuration of the information processing apparatus.

The CPU 201 is a processor that executes, using the RAM 202 as a working memory, a program stored in the ROM 203, and performs overall control of the constituent components of the information processing apparatus 20. Accordingly, as a result of the CPU 201 executing various types of programs, the functions of later-described processing units shown in FIG. 3 are realized.

The information processing apparatus 20 may include one or more pieces of dedicated hardware or graphics processing units (GPUs) that are different from the CPU 201. Also, at least part of processing performed by the CPU 201 may be performed by the GPU or the piece of dedicated hardware. Examples of the piece of dedicated hardware include an application specific integrated circuits (ASIC) and a digital signal processor (DSP).

The RAM 202 temporarily stores a computer program read out from the ROM 203, intermediate results of calculation, and the like.

The ROM 203 stores a computer program and data that do not need to be changed. Furthermore, the ROM 203 stores data necessary for interpolation between key frames. For example, an interpolation method to be used for interpolation between key frames (inter-keyframe interpolation method) is stored. The ROM 203 further stores data or the like that is necessary for determining an inter-keyframe interpolation method.

In the present embodiment, the input/output unit 204 is connected to the server apparatus 120 and the user I/F unit 400. The user I/F unit 400 includes an edit controller 407 for controlling a virtual viewpoint, and a display unit 420 that includes an image display unit 420a for displaying an image (virtual viewpoint image) from a virtual viewpoint, and a UI display unit 420b for displaying, for example, state information of a virtual viewpoint and a UI screen for editing a virtual viewpoint. The image display unit 420a and the UI display unit 420b may be constituted by one monitor, or may be constituted by a plurality of monitors. The edit controller 407 includes, in addition to a general-purpose device such as a keyboard or a mouse that is used by an operator to perform an input operation, a joystick, a knob, a jog dial, and the like that are used by the operator to operate a virtual camera on the UI screen displayed by the UI display unit 420b.

The display unit includes one or more display devices (hereinafter, referred to as "monitors") for displaying information necessary for an operator. If a touch panel display is employed as the monitor, the monitor will serve also as the above-described controller. The monitor displays the UI screen for editing a camera path, and the operator can set a path of virtual viewpoints while viewing the virtual cameras on the UI screen.

Functional Configuration

FIG. 3 is a diagram illustrating an example of a functional configuration of the information processing apparatus 20. The information processing apparatus 20 includes a camera path edit unit 301, and an image generating unit 302 that generates a virtual viewpoint image.

The camera path edit unit 301 controls virtual viewpoints, and determines a set of camera parameters, namely, a series of virtual viewpoints constituting a camera path.

A camera parameter includes, for example, an element such as a position, an orientation, a zoom (focal length), or time. The position of a virtual viewpoint designated by the camera parameter is expressed in a three-dimensional coordinate system, that is, for example, by coordinates of an orthogonal coordinate system with three axes, namely, an X axis, an Y axis, and a Z axis. The original point of this case may be set at a suitable position in a three-dimensional space. The orientation of the virtual viewpoint designated by the camera parameter is expressed by, for example, angles with respect to three axes, namely, a pan axis, a tilt axis, and a roll axis. The zoom of the virtual viewpoint designated by the camera parameter is expressed by, for example, one axis, namely, a focal length axis. Similar to the zoom, the time is also expressed by one axis. In other words, if a camera parameter includes the four types of elements, namely, the position, orientation, zoom, and time of a virtual viewpoint, the camera parameter of the virtual viewpoint will have parameters of eight axes. The camera path edit unit 301 can control the eight axes. Note that a camera parameter may include a parameter that defines an element other than the above-described four types, or may not necessarily include all of the above-described parameters of eight axes.

The camera path edit unit 301 includes an input/output processing unit 311, a key frame determination unit 312, a key frame management unit 313, an interpolation method management unit 314, an interpolation method determination unit 315, a camera parameter interpolation unit 316, and a camera path output unit 317.

The input/output processing unit 311 includes an input accepting unit 318 that acquires an input value that corresponds to an operation performed by an operator on the controller. Specifically, the input accepting unit 318 sequentially acquires input values (in a case of the joystick, the orientation and angle of an inclination when it is inclined) that correspond to a first operation performed on the controller by the operator. Furthermore, the input accepting unit 318 accepts a second operation performed by the operator, such as a mouse click made on a UI screen, or pressing down a button. The input/output processing unit 311 generates a camera parameter based on the input values of the first operation, at a timing at which the second operation of the operator has been accepted.

The input/output processing unit 311 instructs the key frame determination unit 312 to store the generated camera parameter. The input/output processing unit 311 further instructs the interpolation method determination unit 315 to perform interpolation using a key frame method.

The input/output processing unit 311 includes a display control unit 319 that controls display of various types of information for generating a virtual viewpoint image onto the monitor serving as a UI screen. Specifically, a mark of a virtual camera indicating a virtual viewpoint that is being operated, a mark of a virtual camera indicating a key frame, a mark indicating a camera path, and the like are displayed on the UI screen. The operator can use the controller to edit the camera path of virtual viewpoints while viewing information displayed on the monitor. Details of the UI screen will be described later.

In response to the instruction accepted by the input/output processing unit 311 from the operator, the key frame determination unit 312 designates the camera parameter generated by the input/output processing unit 311 as a key frame. The key frame determination unit 312 outputs the camera parameter designated as a key frame to the key frame management unit 313.

The key frame management unit 313 stores, into the RAM 202 or ROM 203, the camera parameter that was designated as a key frame and output from the key frame determination unit 312. Also, the key frame management unit 313 reads a camera parameter designated as a key frame from the RAM 202 or ROM 203, and outputs the read camera parameter to the input/output processing unit 311 and the interpolation method determination unit 315. The key frame management unit 313 may add additional information such as an ID to the camera parameter designated as a key frame, and store the resultant into the ROM 203. Furthermore, the key frame management unit 313 may also update the camera parameter of a designated ID to a new camera parameter determined by the key frame determination unit 312. A configuration is also possible in which the input/output processing unit 311 or the interpolation method determination unit 315 searches for this ID to acquire the corresponding camera parameter designated as a key frame, or the like.

Based on an instruction to determine an interpolation method output from input/output processing unit 311 and camera parameters of a plurality of key frames output from the key frame management unit 313, the interpolation method determination unit 315 determines an inter-keyframe camera parameter interpolation method. Details thereof will be described later.

The interpolation method management unit 314 acquires an inter-keyframe camera parameter interpolation method stored in the ROM 203, and outputs the acquired method to the input/output processing unit 311 and the interpolation method determination unit 315. The interpolation method is, for example, spline interpolation, circular interpolation, linear interpolation, or Bezier interpolation. In the present embodiment, description will be given focusing on methods using spline interpolation and circular interpolation.

Spline interpolation is a method for interpolating camera parameters between key frames with a spline function so that the camera path between the key frames extends along a smooth straight line or curve.

Circular interpolation is a method for interpolating camera parameters between key frames so that the camera path between the key frames extends along an arc of a circle around a given point, the arc passing by the vicinity of the key frames. Note, here, that "circle" is not limited to a perfect circle. For example, a circle in circular interpolation also includes an ellipsoidal circle.

Based on the interpolation method determined by the interpolation method determination unit 315, the camera parameter interpolation unit 316 interpolates camera parameters between the key frames to generate and obtain the camera parameters for connecting the key frames. The camera parameter interpolation unit 316 divides the path from the starting point and the ending point between the key frames into multiple areas. The camera parameter interpolation unit 316 generates, for each of the divided areas, a camera parameter that connects the key frames using the interpolation method determined by the interpolation method determination unit 315.

A camera path is constituted by a plurality of frames, and a viewpoint of an image is defined for each frame. Furthermore, frames necessary to generate a camera path depend on an ending point time and a starting point time. For example, when the camera path with a frame rate of 60 frames/second and inter-keyframe time of 5 seconds is generated, 300 frames are needed as given by 60 frames/second×5 seconds=300 frames. Accordingly, in order to obtain camera parameters for connecting the key frames from the ending point to the starting point, the camera parameter interpolation unit 316 generates 300 camera parameters that correspond to the respective frames using the interpolation method determined by the interpolation method determination unit 315.

The camera path output unit 317 sequentially transmits the camera parameters generated by the camera parameter interpolation unit 316 to the image generating unit 302. Furthermore, some or all of the camera parameters are also transmitted to the input/output processing unit 311 so as to be displayed on the UI screen.

Figure 12:
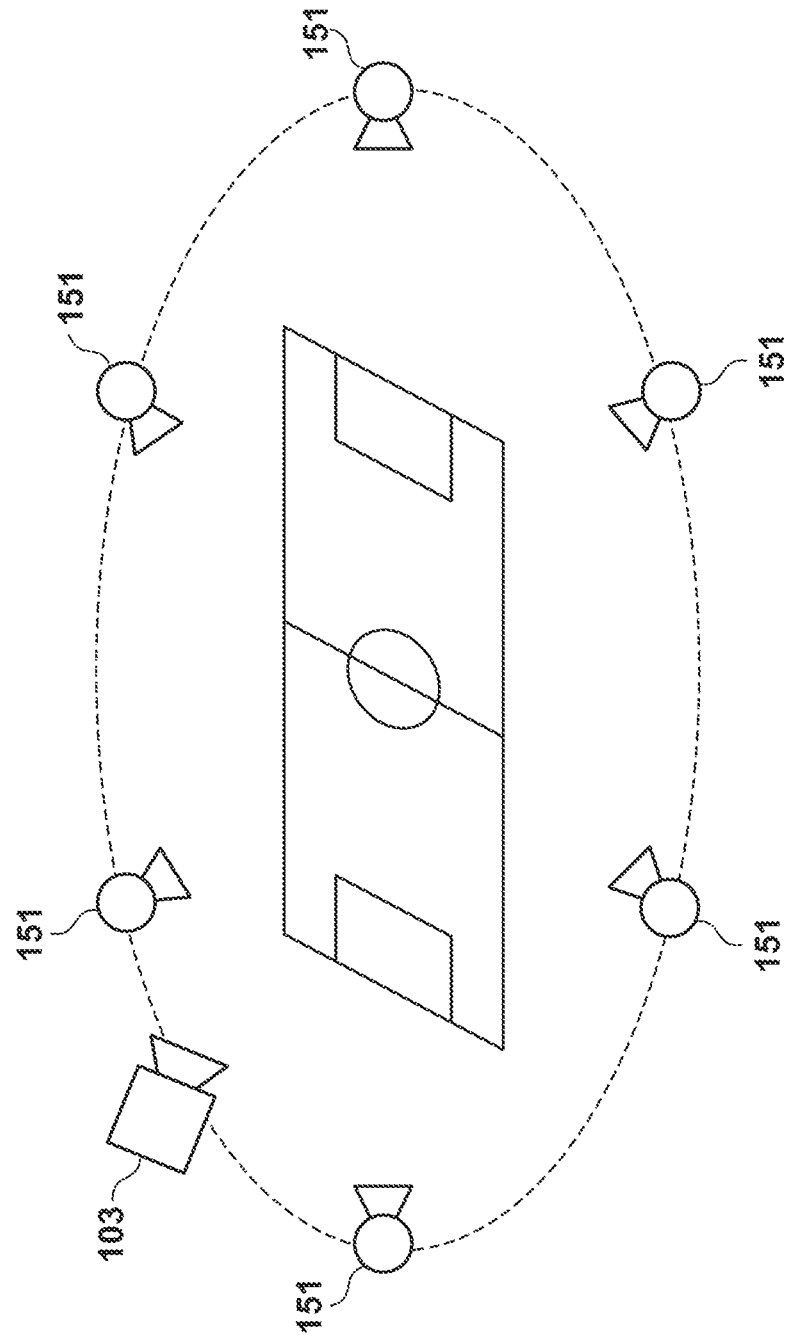
FIG. 12 is a diagram illustrating a layout of actual cameras of the image capturing system, and setting of a virtual camera.

The image generating unit 302 generates, based on a plurality of images synchronously captured from multiple viewpoints, a virtual viewpoint image viewed from a viewpoint (virtual viewpoint) of a virtual camera. As described above, a virtual camera refers to a virtual camera that can freely move inside an image capturing space. FIG. 12 shows an example of the virtual camera and a layout of the actual cameras. The plurality of actual cameras 151 are arranged enclosing the image capturing space. The plurality of actual cameras 151 are set to synchronously capture an image. The virtual camera 103 indicates an arbitral viewpoint (virtual viewpoint) that is different from any of the actual cameras 151. In the present embodiment, a virtual viewpoint image is generated based on a series of camera parameters constituting a camera path. Also, the image generating unit 302 transmits the generated virtual viewpoint image to the input/output processing unit 311. Note that description will be given assuming that the term "image" includes both concepts of a video and a still image, unless otherwise noted. In other words, the image generating unit 302 can process both a still image and a video.

The following will describe an example of a method in which the image generating unit 302 generates a virtual viewpoint image. In the present embodiment, a subject such as a player or a ball whose position changes is referred to as a "foreground". Also, a subject such as a field (grass) other than the foreground is referred to as a "background". First, the image generating unit 302 classifies a plurality of captured images captured by the plurality of actual cameras 151 into foregrounds and backgrounds. The image generating unit 302 calculates, based on the classified plurality of foregrounds, three-dimensional shapes (hereinafter, abbreviated as "3D shape") and positions of the foregrounds such as a player and a ball. Then, the image generating unit 302 uses the calculated 3D shapes and positions of the foregrounds to reconstruct the foregrounds viewed from the viewpoint of the virtual camera 103. Then, the image generating unit 302 generates, based on the classified plurality of backgrounds, a background that corresponds to the viewpoint of the virtual camera 103. Note that the image generating unit 302 may also use the 3D shape of the background to generate a background that corresponds to the viewpoint of the virtual camera 103. The image generating unit 302 synthesizes the reconstructed foregrounds with the generated background to generate a virtual viewpoint image.

Note that the information processing apparatus 20 may also be used to edit a camera path of computer graphics image (CG image). In this case, a CG renderer may be used, instead of the image generating unit 302, and the virtual camera 103 serving as a virtual viewpoint indicates a viewpoint of the CG image and can move to a suitable position within a CG space.

Note that, in the present embodiment, description will be given assuming that a virtual viewpoint image is generated by the image generating unit 302 of the information processing apparatus 20, but may also be generated by another information processing apparatus (such as, for example, the server apparatus 120) that includes the same function as that of the image generating unit 302.

The functions of the constituent components shown in FIG. 3 can be realized by the CPU deploying a program code stored in the ROM onto the RAM and executing it. Alternatively, some or all of the functions of the constituent components shown in FIG. 3 may also be realized by hardware such as an ASIC or an electronic circuit.

Regarding UI Screen

FIGS. 4A and 4B are diagrams illustrating examples of a virtual viewpoint image and a UI screen that are displayed on the monitor (display unit 420) by the input/output processing unit 311. With reference to FIGS. 4A and 4B, an example of the virtual viewpoint image obtained by capturing an image of a soccer ground on which players are playing will be described. FIG. 4A shows a virtual viewpoint image 401 that was generated by the image generating unit 302 and is displayed on the monitor (image display unit 420a) via the input/output processing unit 311.

FIG. 4B shows an example of a UI screen 402 for editing, using the input/output processing unit 311, a camera path that is displayed on the monitor (UI display unit 420b). The UI screen 402 shown in FIG. 4B is such that marks of virtual cameras indicating the states of virtual viewpoints are superimposed on a plan view of the soccer ground viewed from directly above.

Specifically, the input/output processing unit 311 displays the UI screen 402 on which a mark 403 that indicates state information such as the position and orientation of the virtual camera that is being operated, and marks 404 to 406 that each indicate state information such as the position and orientation of the corresponding virtual camera designated as a key frame are superimposed.

The input/output processing unit 311 also displays the plan view on which marks 408 and 409 with an arrow indicating a direction in which the virtual camera moves is superimposed, each mark indicating a camera path between the key frames. An interpolation method can be distinguished from a mark indicating a camera path. For example, as shown in FIG. 4B, the mark 409 with a dotted arrow indicates a camera path of camera parameters generated using spline interpolation. Furthermore, the mark 408 with a solid arrow indicates a camera path of camera parameters generated using circular interpolation.

An operator can use, while viewing the information displayed on the UI screen, the controller such as a joystick to move the marks 403 to 406 of the virtual viewpoints. With such an operation, it is possible to edit the camera parameters of virtual viewpoints indicated by the marks of the virtual cameras. Furthermore, the operator can visually confirm, based on the marks 408 and 409 of the arrows, which interpolation method is used to generate the camera parameters that connect key frames.

Note that the marks indicating state information and a camera path of virtual viewpoints may be of any shape as long as the state information and the camera path of the virtual viewpoints can be recognized, and are not limited to the marks shown in FIG. 4B. Furthermore, the functions that can be operated by an operator using the UI screen 402 are not limited to those. For example, a switching button may also be displayed for switching modes between automatically determining and manually determining the interpolation method managed by the interpolation method management unit 314 or interpolation of camera parameters. Alternatively, a slide bar with which it is possible to change a parameter according to the condition for determining an interpolation method may also be displayed.

The edit controller 407 is an example of the controller used by an operator to edit a camera path. The operator can use, while viewing the virtual viewpoint image 401 and the UI screen 402 displayed on the monitor, the controller such as a joystick of the edit controller 407 to operate the virtual camera displayed on the UI screen, and edit camera parameters.

Processing for Interpolating Camera Parameter

Figure 5:
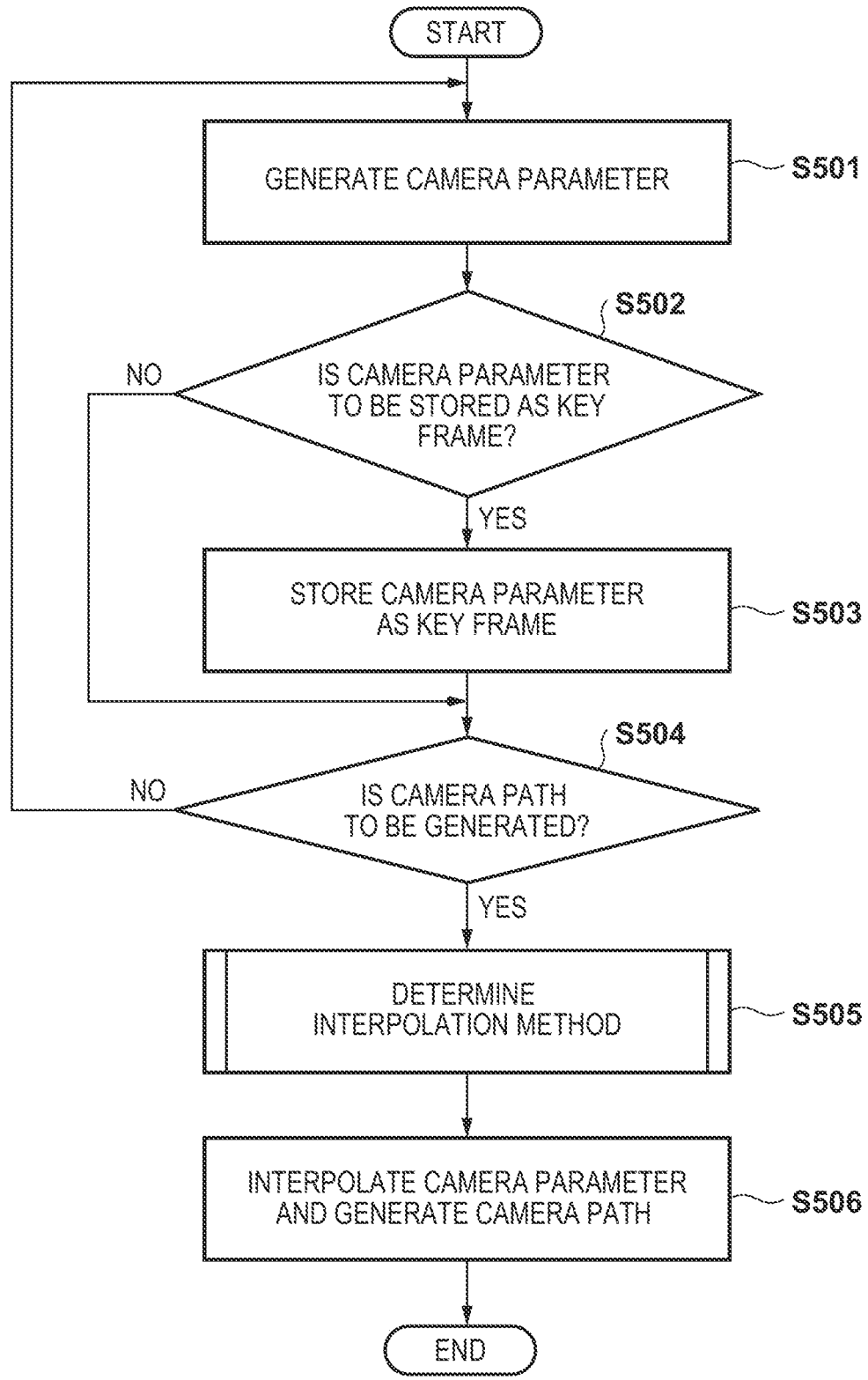
FIG. 5 is a flowchart illustrating processing for generating a camera path between key frames.

FIG. 5 is a flowchart illustrating a series of processing for interpolating camera parameters for connecting key frames. The series of processing shown in the flowchart of FIG. 5 are performed by the CPU deploying a program code stored in the ROM onto the RAM and executing it. Also, some or all of the functions of the steps shown in FIG. 5 may be realized by hardware such as an ASIC or an electronic circuit. Note that the sign "S" in the description of the processing means a step in the flowchart, and the same applies to other flowcharts described later.

Hereinafter, the summary of the processing performed by the information processing apparatus 20 will be described with reference to FIG. 5. The flow of FIG. 5 starts in response to an instruction to start generating a camera path given from the operator, the instruction serving as a trigger.

In step S501, the input/output processing unit 311 generates, based on an input value that corresponds to an operation of the controller performed by the operator, a camera parameter that defines a virtual viewpoint. For example, the operator performs an operation of inclining the joystick of the controller to move a mark indicated by a virtual camera on the UI screen frontward, rearward, leftward, rightward, upward, or downward, and designate a desired position. Also, the operator operates the controller to rotate the camera on the UI screen in a pan direction, tilt direction, or roll direction, and designate the orientation of the virtual viewpoint. Furthermore, the operator operates the controller to designate the time of a scene. When the operator has designated the position and orientation of the virtual viewpoint, and time of the scene, the input/output processing unit 311 generates a camera parameter based on the input value that corresponds to the designation, and displays a virtual viewpoint image based on the generated camera parameter onto the monitor. The camera parameter generated by the input/output processing unit 311 is transmitted to the key frame determination unit 312.

In step S502, the key frame determination unit 312 determines, based on an input value that corresponds to an operation of the controller performed by the operator, whether or not the camera parameter generated in step S501 is to be stored as a key frame. For example, if an input value that corresponds to a first button of the controller being pressed down is accepted by the input/output processing unit 311, the key frame determination unit 312 designates the generated camera parameter as a key frame, and determines that the generated camera parameter is to be stored as a key frame.

If it is determined that the camera parameter is to be stored as a key frame (Yes in step S502), the key frame management unit 313 acquires, in step S503, the camera parameter from the key frame determination unit 312 and stores the acquired camera parameter into the RAM 202 or ROM 203 as a key frame.

If it is determined that the camera parameter is not to be stored as a key frame (No in step S502), or if the processing in step S503 is complete, the procedure moves to step S504.

In step S504, the interpolation method determination unit 315 determines, based on an input value that corresponds to an operation of the controller performed by the operator, whether or not a camera parameter for connecting the key frames is to be interpolated and a camera path is to be generated. For example, if an input value that corresponds to a second button of the controller being pressed down is accepted by the input/output processing unit 311, the input/output processing unit 311 instructs the interpolation method determination unit 315 to determine an interpolation method. Upon receiving the instruction to determine an interpolation method from the input/output processing unit 311, the interpolation method determination unit 315 determines that a camera path between the stored key frames is to be generated.

If it is determined that no camera path is to be generated (No in step S504), the procedure returns to step S501, and repeats the processing until storing a key frame. Because at least two key frames are needed to generate a camera path, if no key frame is stored, or only one key frame is stored, the determination will also result in "No".

If it is determined that a camera path is to be generated (Yes in step S504), the interpolation method determination unit 315 determines, in step S505, an interpolation method to be performed between the key frames (inter-keyframe interpolation method), based on a predetermined condition. The processing performed in step S505 will be described in detail later.

In step S506, the camera parameter interpolation unit 316 obtains, based on the inter-keyframe interpolation method acquired from the determination unit 315 and the camera parameters of the key frames, one or more camera parameters that connect the key frames. Also, the camera parameter interpolation unit 316 outputs the obtained camera parameters to the camera path output unit 317.

The order in which the camera path generated by the camera parameter interpolation unit 316 passes the key frames may be the same as the order of the key frames stored in the key frame management unit 313, or as the order of the above-described IDs of the key frames. Alternatively, if the camera parameters of the key frames include time parameters, the chronological order thereof may also be used.

The camera path between the key frames generated using circular interpolation is indicated in FIG. 1 as being a camera path on which the virtual camera moves in a counterclockwise manner, but whether the positions of the virtual camera move in a counterclockwise manner or a clockwise manner may depend on an input performed by the operator. Also, the direction in which the virtual camera turns may be determined automatically based on the distance between two virtual viewpoints that correspond to two key frames.

After the completion of the present flow, the camera parameters indicating the camera path that were given to the camera path output unit 317 are transmitted from the camera path output unit 317 to the image generating unit 302. The image generating unit 302 generates, based on the camera parameters, a virtual viewpoint image.

Control of Determination of Camera Parameter Interpolation Method

Figure 6B:
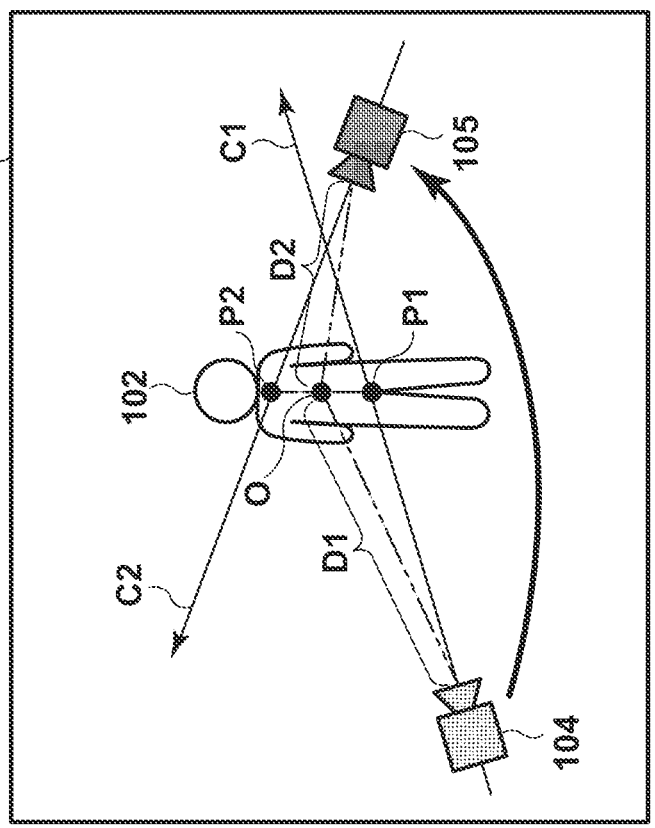
FIGS. 6A and 6B are diagrams illustrating a relationship of sight vectors between key frames.
Figure 6A:
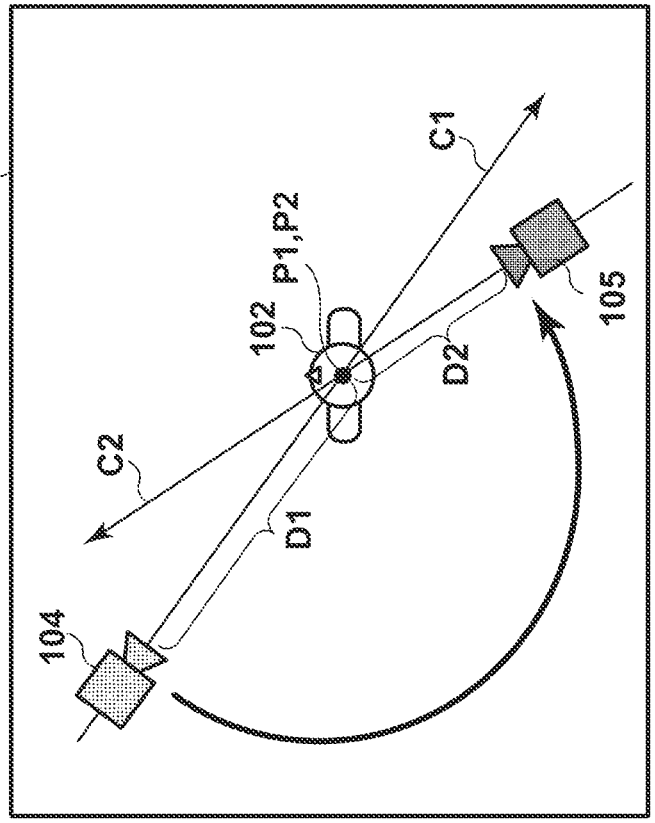

The following will describe in detail the processing for determining an inter-keyframe interpolation method that is performed by the interpolation method determination unit 315. Similar to FIG. 1, FIGS. 6A and 6B are diagrams showing, as the virtual camera 104 and the virtual camera 105, the camera parameters designated as key frames. Furthermore, in FIGS. 6A and 6B, a sight vector C1, which indicates the line of sight of the virtual camera 104, and a sight vector C2, which indicates the line of sight of the virtual camera 105, are superimposed on the diagrams.

It is assumed that a P1 is a point on the sight vector C1 that is the closest to the sight vector C2. Similarly, it is assumed that a P2 is a point on the sight vector C2 that is the closest to the sight vector C1. In the example of FIGS. 6A and 6B, the point at which the sight vector C2 and the sight vector C1 are the closest to each other is located on the player 102. Accordingly, FIG. 6A shows that the P1 and the P2 are located on the player 102.

FIG. 6B shows the diagram of FIG. 6A with the player viewed from the side. It is clear from FIG. 6B that the point P1 and the point P2 are located at different positions on the player 102. In other words, it is shown that the sight vector C1 and the sight vector C2 in FIGS. 6A and 6B do not cross each other in the three-dimensional coordinate system. If the sight vectors cross each other, the intersection therebetween will be located at the same point as the point P1 and the point P2.

A middle point between the point P1 and the point P2 is assumed to be a point O. The distance from the position of the virtual camera 104 (position of the virtual viewpoint) to the point O is assumed to be a D1. The distance from the position of the virtual camera 105 (position of the virtual viewpoint) to the point O is assumed to be a distance D2. In the present embodiment, the interpolation method determination unit 315 determines an interpolation method based on the distance D1 and the distance D2.

Note that the point O for measuring the distance D1 and the distance D2 is not limited to the middle point between the point P1 and the point P2. A suitable point that is included in a predetermined region including the point P1 and the point P2 may also be used as the point O. For example, a configuration is also possible in which the distance from the position of the virtual camera 104 to the P1 is set as the distance D1, and the distance from the position of the virtual camera 105 to the P2 is set as the distance D2.

Figure 7:
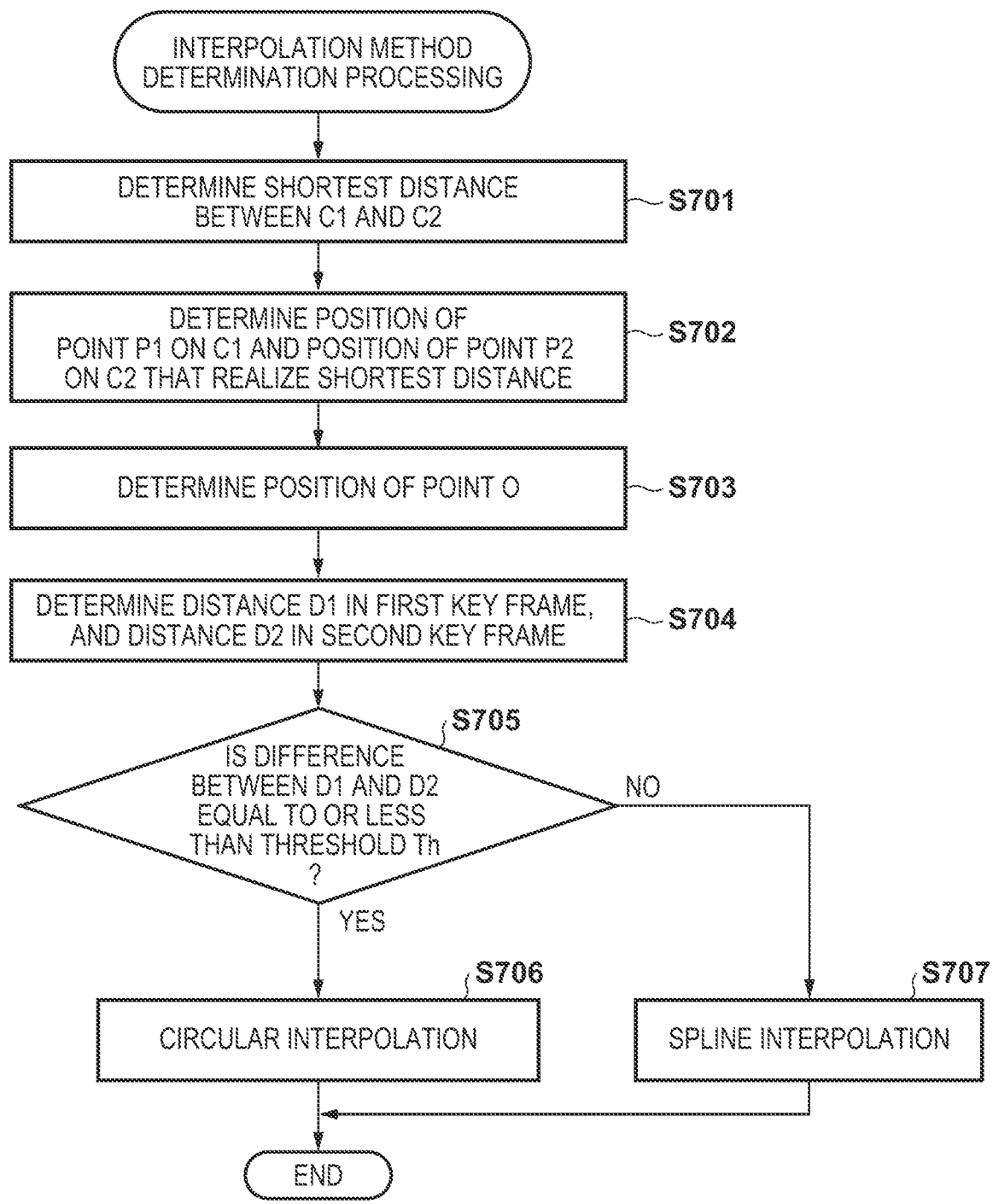
FIG. 7 is a flowchart illustrating interpolation method determination processing.

FIG. 7 is a flowchart illustrating in detail the processing for determining a camera parameter interpolation method that is performed in step S505 in FIG. 5. In the present embodiment, a method for determining the camera parameter interpolation method for two key frames will be described.

In step S701, the interpolation method determination unit 315 acquires, from the key frame management unit 313, camera parameters of two target key frames. Then, the interpolation method determination unit 315 calculates the sight vector C1 based on the camera parameter indicating the position and orientation of the virtual viewpoint of one (first key frame) of the key frames. The interpolation method determination unit 315 calculates the sight vector C2 based on the camera parameter indicating the position and orientation of the virtual viewpoint of the other one (second key frame) of the key frames. Then, the interpolation method determination unit 315 calculates the distance (shortest distance) at which the sight vector C1 and the sight vector C2 are the closest to each other. For example, if the sight vector C1 and the sight vector C2 cross each other, the shortest distance is calculated as 0.

In step S702, the interpolation method determination unit 315 calculates and determines the position of the point P1 on the sight vector C1 and the position of the point P2 on the sight vector C2 that realize the shortest distance obtained in step S702.

In step S703, the interpolation method determination unit 315 determines the position of the point O based on the point P1 and the point P2. In the present embodiment, the middle point between the point P1 and the point P2 is calculated, and the calculated middle point is determined as the point O. If the sight vector C1 and the sight vector C2 cross each other in the three-dimensional coordinate system, the point P1, the point P2, and the point O are determined as being located at the same position.

In step S704, the interpolation method determination unit 315 calculates and determines the distance D1 from the position of the virtual viewpoint of the first key frame to the point O, and the distance D2 from the position of the virtual viewpoint of the second key frame to the point O.

In step S705, the interpolation method determination unit 315 performs determination processing based on the magnitude relationship between the distance DL and the distance D2, and a first threshold Th. In the present embodiment, the interpolation method determination unit 315 determines whether or not the difference between the distance D1 and the distance D2 is equal to or smaller than the threshold Th.

If it is determined that the difference between the distance D1 and the distance D2 is equal to or smaller than the threshold (Yes in step S705), the interpolation method determination unit 315 determines, in step S706, circular interpolation as the camera parameter interpolation method for the target key frames. If the distance D1 and the distance D2 are substantially the same, the virtual viewpoints of the camera parameters designated as the key frames will be positioned in the vicinity of an arc of a circle centered at the point O. In this case, it is conceivable that the operator expects an arc-shaped camera path around an object located at the point O. Accordingly, if the difference between the distance D1 and the distance D2 is equal to or smaller than the threshold, the interpolation method determination unit 315 determines circular interpolation as the interpolation method, so that an arc-shaped camera path between the key frames is generated.

If it is determined that the difference between the distance D1 and the distance D2 is equal to or larger than the threshold Th (No in step S705), the interpolation method determination unit 315 determines, in step S707, spline interpolation as the camera parameter interpolation method for the target key frames.

The determination method in which the difference between the distance D and the distance D2 is compared with the threshold Th is used, but the present invention is not limited to this. Additionally, the interpolation method determination unit 315 may also determine, based on the ratio of the distance D1 to the distance D2, whether to use circular interpolation or spline interpolation. In this case, for example, a configuration is also possible in which, if the ratio of the distance D1 to the distance D2 is within a predetermined value, it is determined to use circular interpolation, and otherwise, it is determined to use spline interpolation. Also, a configuration is also possible in which, if the difference between the distance D1 and the distance D2 is smaller than the threshold Th, it is determined to use circular interpolation as the camera parameter interpolation method for the target key frames, and if the difference is equal to or larger than the threshold Th, it is determined to use spline interpolation. Furthermore, the interpolation method determination unit 315 may also perform processing for updating the condition for determining the interpolation method, based on an input value accepted by the input/output processing unit 311. For example, the interpolation method determination unit 315 may change the threshold Th based on an input value input by the operator.

The interpolation method determination unit 315 acquires the determined interpolation method from the ROM 203 via the interpolation method management unit 314. The interpolation method determination unit 315 outputs the camera parameters between the key frames and the interpolation method, to the camera parameter interpolation unit 316.

As described above, according to the present embodiment, if a given condition is met, circular interpolation, instead of spline interpolation, is determined as the inter-keyframe camera parameter interpolation method. Accordingly, if an operator desires to generate a camera path such that a virtual camera moves around a given point, the operator can generate an arc-shaped camera path without designating multiple key frames.

Note that the method for determining the interpolation method is not limited to the method based on the distances between the point O determined by the sight vectors and the positions of the virtual viewpoints. The interpolation method may also be determined based on another type of information based on the positions and orientations of the virtual viewpoints indicated by camera parameters designated as key frames. For example, if the orientations of the virtual viewpoints of the respective key frames are such that they capture images of themselves, it is conceivable that the images are captured from the front and back or from the left or right of the same object. Accordingly, also in this case, circular interpolation may also be determined. In other words, if the position of the virtual viewpoint of the second key frame is included in the field of view of the virtual viewpoint of the first key frame, and the position of the virtual viewpoint of the first key frame is included in the field of view of the virtual viewpoint of the second key frame, circular interpolation may be determined as the interpolation method.

Furthermore, a configuration is also possible in which an inter-keyframe camera parameter interpolation method includes an automatic mode in which the method is automatically determined, and a manual mode in which the method is determined based on selection of an operator. Furthermore, the modes may be switched, based on selection of the operator or depending on a predetermined condition. In this case, when the automatic mode is being set, the interpolation method determination unit 315 will determine the interpolation method based on the procedure of the flow shown in FIG. 7.

Embodiment 2

Embodiment 1 has described the processing for determining, in a case where there are two key frames, a method for interpolating a camera parameter between the key frames. The present embodiment will describe processing for determining, in a case where three or more key frames are designated by an operator, a method for interpolating a camera parameter between the key frames. The description of the present embodiment will be given focusing on the differences from Embodiment 1. The portions that are not specifically mentioned have the same configuration and processing as those of Embodiment 1.

Figure 8:
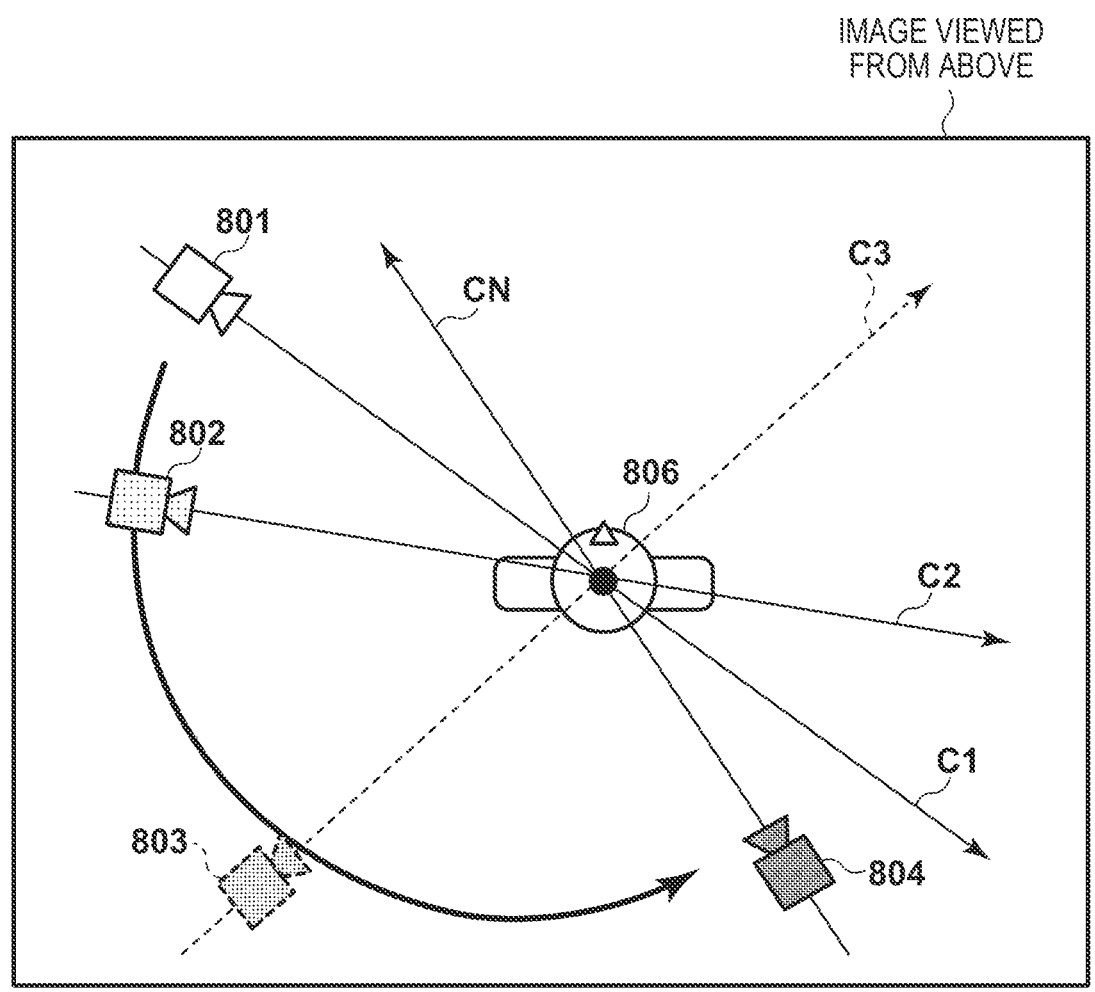
FIG. 8 is a diagram illustrating a relationship of sight vectors between three or more key frames.

Similar to FIG. 6A, FIG. 8 is a diagram in which a player 806 is viewed from above with camera parameters of key frames serving as virtual cameras superimposed thereon. In FIG. 8, four virtual cameras, namely, virtual cameras 801 to 804 are designated as key frames. In other words, four key frames are designated by the operator. In FIG. 8, description will be given assuming that the number of key frames is four, but the present invention is not limited to this. In the present embodiment, the operator may designate any number of key frames.

FIG. 8 shows sight vectors C1 to C3, which indicate lines of sight of the virtual cameras 801 to 803 serving as the key frames. A sight vector CN is a sight vector that indicates the line of sight of the virtual camera of the N-th key frame, out of N key frames designated by the operator. In the example of FIG. 8, the number N of key frames is four, and thus CN indicates the sight vector of the virtual camera 804 of the fourth key frame.

Figure 9:
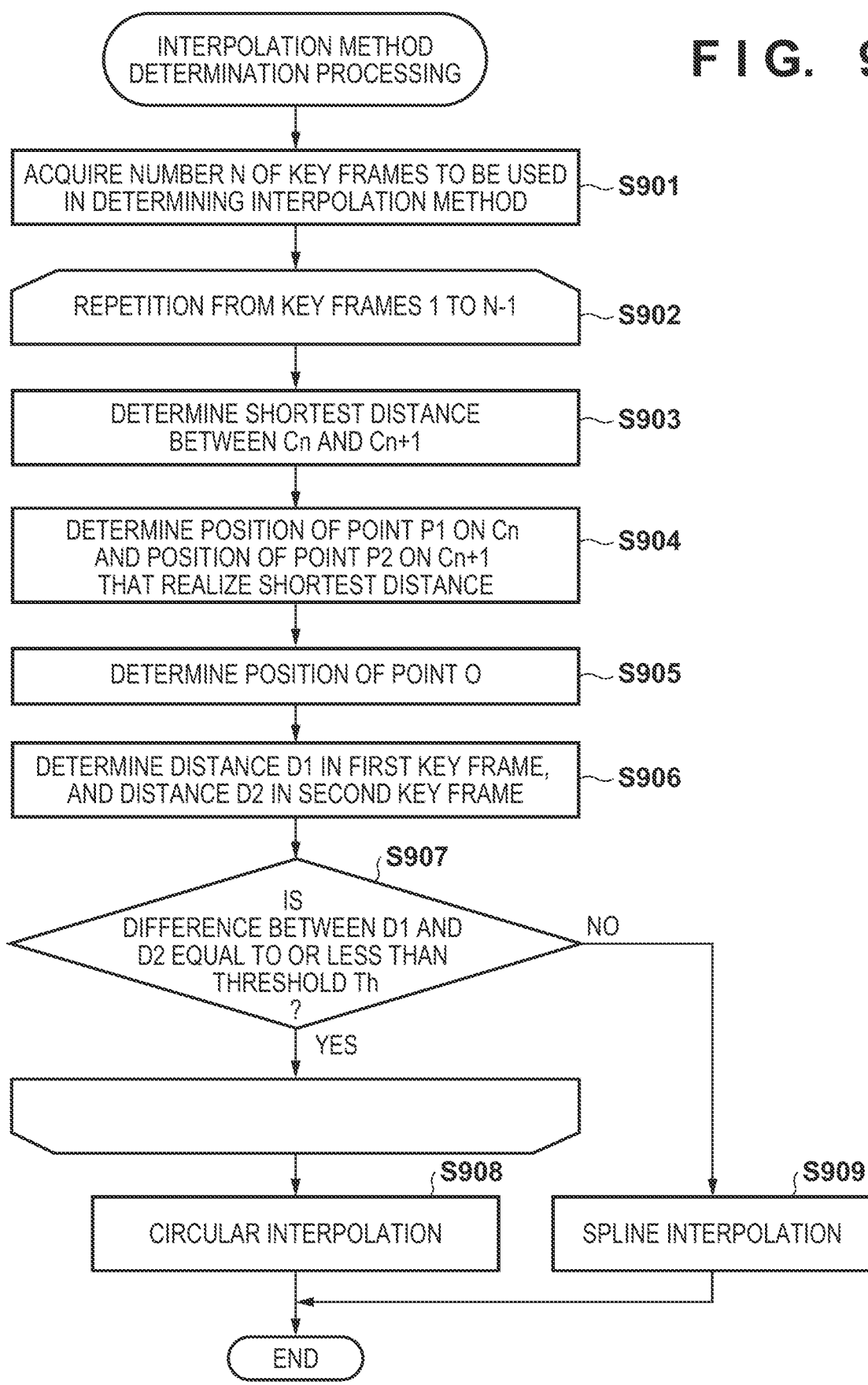
FIG. 9 is a flowchart illustrating interpolation method determination processing.

FIG. 9 is a flowchart illustrating content of the processing for determining a camera parameter interpolation method performed in step S505 shown in FIG. 5 according to the present embodiment. The interpolation method determination unit 315 of the present embodiment determines a camera parameter interpolation method, based on N camera parameters acquired from the key frame management unit 313.

In step S901, the interpolation method determination unit 315 acquires, based on an input value that corresponds to an operation of the controller performed by the operator, the number N of target key frames for which camera parameter interpolation is to be performed by the camera parameter interpolation unit 316, and camera parameters of the target key frames. For example, if, out of the stored key frames, a plurality of target key frames are designated by the operator, the number of target key frames is acquired as "N".

From step S902 onwards, out of the target key frames designated in step S901, a pair of key frames, namely, a determination target key frame and a key frame adjacent to the determination target key frame are subjected to processing from steps S903 to S907. For example, processing from steps S903 to S907 is repeated on, out of the target key frames, the first to the (N−1)-th key frames set as the determination target key frames.

Note that, as a key frame adjacent to the determination target key frame, for example, a key frame whose virtual viewpoint is the closest to the position of the virtual viewpoint of the determination target key frame, or a key frame whose virtual viewpoint has a time parameter closest to that of the determination target key frame is to be focused. Note however that, if a determination target key frame and a key frame that is the closest to the determination target key frame have already been processed, the key frame second closest to the target key frame is to be focused.

If the key frame that is the closest to the position of the determination target key frame is set as the adjacent key frame, processing will be performed on up to three combinations in the example of FIG. 8. That is, processing will be performed with the combination of the virtual camera 801 and the virtual camera 802, the combination of the virtual camera 802 and the virtual camera 803, and the combination of the virtual camera 803 and the virtual camera 804.

In step S903, the interpolation method determination unit 315 calculates a sight vector Cn based on the camera parameter that indicates the position and orientation of the virtual viewpoint of the determination target key frame (first key frame). Furthermore, the interpolation method determination unit 315 calculates a sight vector Cn+1 based on the camera parameter that indicates the position and orientation of the virtual viewpoint of the key frame (second key frame) adjacent to the first key frame. Then, the interpolation method determination unit 315 calculates the shortest distance between the sight vector Cn and the sight vector Cn+1. The method for calculating the shortest distance is the same as that in step S701.

In step S904, similar to step S702, the interpolation method determination unit 315 calculates the positions of the point P1 on the sight vector Cn and the point P2 on the sight vector Cn+1 that realize the shortest distance obtained in step S901.

In step S905, the interpolation method determination unit 315 determines the position of the point O based on the point P1 and the point P2. The processing in step S905 is the same as that in step S703.

In step S906, the interpolation method determination unit 315 calculates and determines the distance D1 from the position of the virtual viewpoint of the first key frame to the point O, and the distance D2 from the position of the virtual viewpoint of the second key frame to the point O.

In step S907, the interpolation method determination unit 315 determines whether or not the difference between the distance D and the distance D2 is equal to or smaller than the threshold Th.

If it is determined that the difference between the distance D1 and the distance D2 is equal to or smaller than the threshold (Yes in step S907), the procedure returns to step S902, where processing from steps S903 to S907 is repeated on a key frame that has not been targeted for determination, out of the key frames other than the N-th key frame. If, out of N−1 combinations of adjacent key frames, there is no combination in which the difference between the distance D1 and the distance D2 is larger than the threshold Th, the procedure moves to step S908.

In step S908, the interpolation method determination unit 315 determines circular interpolation as the interpolation method for the N key frames.

If it is determined that the difference between the distance D1 and the distance D2 is large than the threshold Th (No in step S907), the interpolation method determination unit 315 determines, in step S909, spline interpolation as the camera parameter interpolation for the N key frames, and the procedure is ended. In other words, if, out of N−1 combinations of adjacent key frames, there is at least one combination in which the difference between the distance D1 and the distance D2 is larger than the threshold Th, spline interpolation is determined as the interpolation method for the N key frames.

As described above, according to the present embodiment, even if there are three or more key frames, the interpolation method that is appropriate for the positions and orientations of the virtual viewpoints serving, as the key frames, can be determined. In other words, if there are a plurality of key frames, a camera path of camera parameters generated using spline interpolation, instead of circular interpolation, approximates the camera path expected by an operator. Therefore, since, in the present embodiment, spline interpolation is often determined as the interpolation method, it is possible to generate a camera path expected by the operator.

Note that, similar to Embodiment 1, if circular interpolation is determined as the interpolation method, it may be determined whether or not the camera path between key frames extends in a counterclockwise manner or a clockwise manner, based on an input performed by the operator. Alternatively, if circular interpolation is determined, the direction in which the virtual viewpoints move may be determined based on the density of the arranged key frames. For example, if key frames are arranged on an arc, control may be performed such that the virtual viewpoints move from the key frame at the starting point in a direction in which the key frames are thickly arranged.

Alternatively, if circular interpolation is determined as the interpolation method, a camera path to be generated does not need to pass through all of key frames. For example, if, in the case of FIG. 8, circular interpolation is determined, an arc-shaped camera path passing through the positions of the virtual cameras 801 to 804 serving as the key frames cannot be generated. Therefore, in order to generate a clear arc-shaped camera path, camera parameters may also be determined that correspond to a camera path that does not pass through the position of the virtual camera 803.

Embodiment 3

The present embodiment will describe processing for determining, using a plurality of thresholds, the camera parameter interpolation method. The description of the present embodiment will be given focusing on the differences from Embodiment 1. The portions that are not specifically mentioned have the same configuration and processing as those of Embodiment 1.

Figure 10:
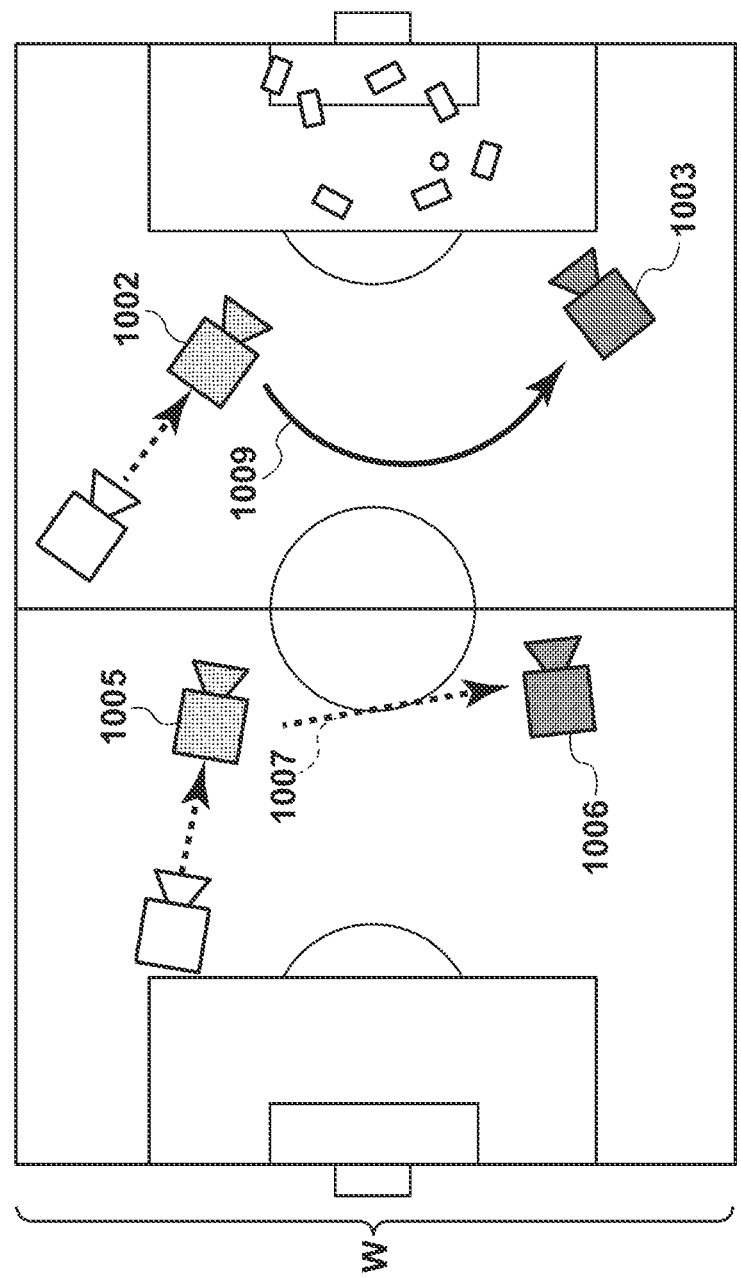
FIG. 10 is a diagram illustrating a UI screen for editing a camera path.

FIG. 10 shows a plan view of the soccer ground viewed from directly above, with virtual cameras indicating the position and orientation of virtual viewpoints and camera paths between key frames superimposed thereon.

With reference to FIG. 10, a case will be described in which camera parameters indicated by a virtual camera 1002 and a virtual camera 1003 are designated as camera parameters of key frames. Similarly, a case will be described in which camera parameters indicated by a virtual camera 1005 and a virtual camera 1006 are designated as camera parameters of key frames.

First, a case where the camera parameters indicated by the virtual camera 1002 and the virtual camera 1003 serving as key frames are designated is taken into consideration. An image capture scene in which a virtual viewpoint image is captured with the virtual camera 1002 and the virtual camera 1003 defined as key frames is a scene obtained by capturing a shoot scene from a position close to a player, and thus, as described above, an arc-shaped camera path 1009 is expected. Accordingly, the method for interpolating camera parameters between the virtual camera 1002 and the virtual camera 1003 is preferably circular interpolation.

On the other hand, a case where the camera parameters indicated by the virtual camera 1005 and the virtual camera 1006 are designated as key frames is taken into consideration. In this case, the image capture scene is a scene obtained by capturing the entirety including a goal scene, and thus a straight camera path 1007 between the virtual camera 1005 and the virtual camera 1006 is expected. Accordingly, as shown in FIG. 10, the method for interpolating camera parameters between the virtual camera 1005 and the virtual camera 1006 is preferably spline interpolation.

However, the position of the virtual camera 1006 is located at a position obtained such that the position of the virtual camera 1005 is moved in substantially parallel to the goal line of the field. Furthermore, the virtual camera 1005 and the virtual camera 1006 are oriented so as to capture an image focusing on the goal of the field. Accordingly, if the distance D1 from the position of the virtual camera 1005 and the point O, and the distance D2 from the position of the virtual camera 1006 and the point O are determined using the method of Embodiment 1, the distance D1 and the distance D2 will be substantially equal to each other. Therefore, there may be a case where the difference between the distance D1 and the distance D2 is not larger than the threshold, and thus there may be the risk that circular interpolation is determined as the method for interpolating a camera parameter between the virtual camera 1005 and the virtual camera 1006. Accordingly, the present embodiment refers to an aspect in which a second threshold is provided to restrict a case where circular interpolation is determined.

Figure 11:
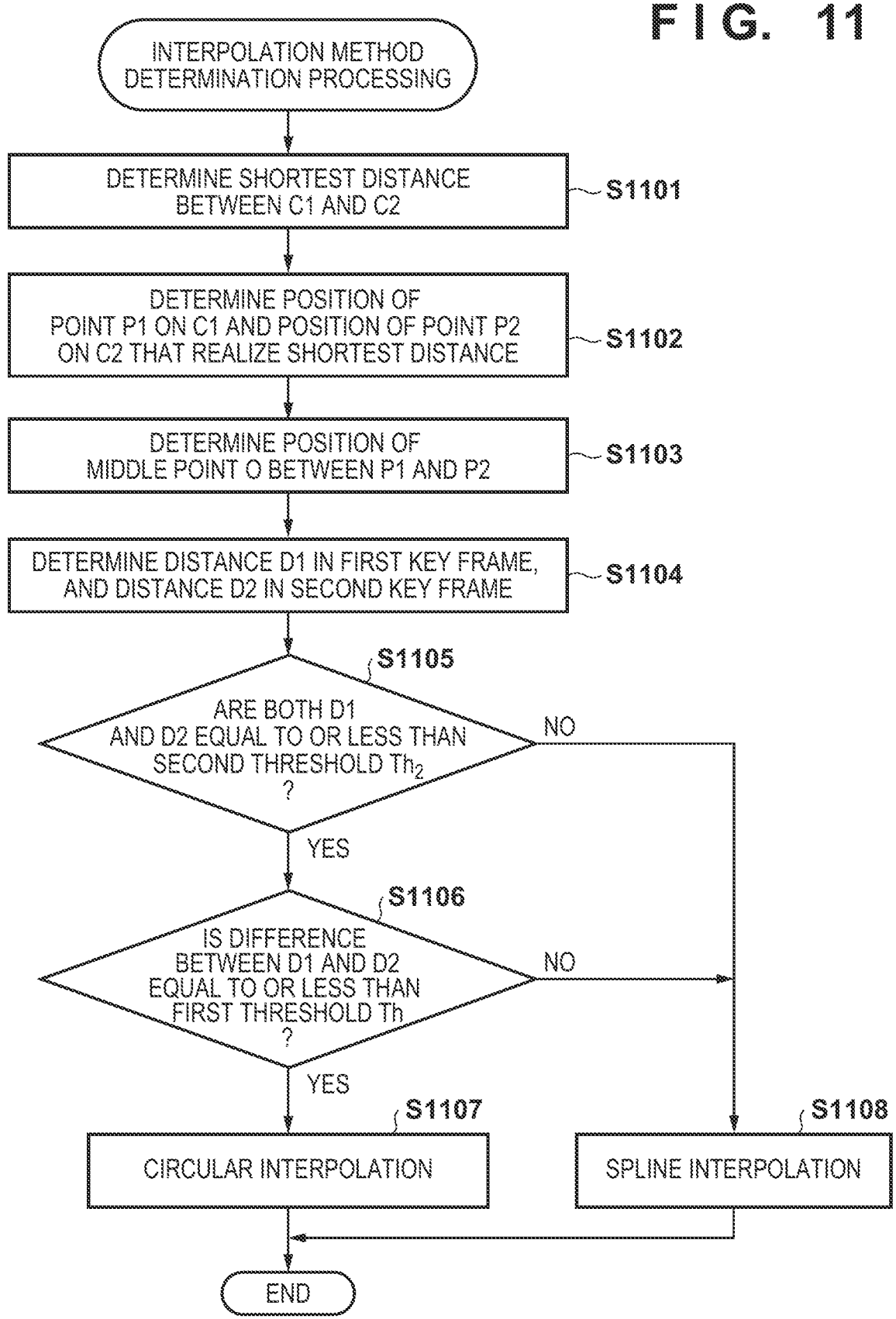
FIG. 11 is a flowchart illustrating interpolation method determination processing.

FIG. 11 is a flowchart illustrating content of the processing for determining a camera parameter interpolation method that is performed in step S505 in FIG. 5, according to the present embodiment.

The description of the present flowchart will be given assuming that the camera parameter interpolation method for two target key frames is determined. Processing in steps S1101 to S1104 is the same as the processing from step S701 to step S704, and thus descriptions thereof are omitted.

In step S1105, the interpolation method determination unit 315 acquires a second threshold $Th_2$ and performs determination processing based on the magnitude relationship between the distance D and the distance D2, and the second threshold $Th_2$. In the present embodiment, the interpolation method determination unit 315 determines whether or not both the distance D1 and the distance D2 are equal to or smaller than the second threshold $Th_2$. Furthermore, in the present embodiment, description will be given assuming that a pitch width W of the soccer ground is used as the second threshold $Th_2$. In the ROM 203, the pitch width W of the soccer ground obtained by measuring the soccer ground is stored in advance. The interpolation method determination unit 315 acquires, from the ROM 203, the pitch width W serving as the second threshold $Th_2$.

If it is determined that at least one of the distance D1 and the distance D2 is larger than the second threshold $Th_2$ (No in step S1105), the procedure moves to step S1108, where the interpolation method determination unit 315 determines spline interpolation as the interpolation method. In the present embodiment, determination is made using the second threshold, and thus, if, for example, the position of the virtual viewpoint of any one of the key frames is largely deviated from the object by a distance larger than a predetermined distance, it is possible to prevent circular interpolation from being determined.

If it is determined that both of the distance D1 and the distance D2 are equal to or smaller than the second threshold $Th_2$ (Yes in step S1105), the procedure moves to step S1106. Processing in steps S1106 to S1108 is the same as the processing in steps S705 to S707. In other words, if the difference between the distance D1 and the distance D2 is equal to or smaller than the first threshold Th (Yes in step S1106), circular interpolation is determined (step S1107), whereas if the difference is larger than the first threshold Th (No in step S1106), spline interpolation is determined (step S1108).

As described above, according to the present embodiment, even if circular interpolation is determined in Embodiment 1, determination can be made using the second threshold, and thus spline interpolation can be determined for an image capture scene for which spline interpolation is preferable.

Note that the second threshold $Th_2$ is not limited to the pitch width. Additionally, for example, if the virtual viewpoint image is an image obtained by capturing a track and field competition held in an athletics stadium, the length of the straight race track may be used as the second threshold $Th_2$. Alternatively, the second threshold may be an input value input by an operator. One or more second thresholds may also be used.

Furthermore, for example, in place of or in addition to the above-described determination in step S1105, the following determination method may also be used.

A configuration is also possible in which the distance from the point P1 to the point O and the distance from the point P2 to the point O are calculated, the calculated distances are compared to a predetermined threshold, and if either of the distances is equal to or larger than a predetermined threshold, spline interpolation will be determined, irrespective of a result of the determination in step S1106. If either of the distance from the point P1 to the point O and the distance from the point P2 to the point O is equal to or larger than a predetermined length, it is conceivable that the orientation of the virtual viewpoint has largely changed between the key frames. Thus, this is because that, instead of circular interpolation, spline interpolation enables the virtual viewpoint to follow an object better.

Moreover, a configuration is also possible in which it is determined whether any one of the points P1, P2 and O is located inside or outside of the ground, and if it is located outside of the ground, spline interpolation is determined, irrespective of a result of the determination in step S1106. In a case of circular interpolation, an arc-shaped camera path extending around the vicinity of any one of the points P1, P2, and O is generated. Because it is not often the case where the virtual viewpoint is moved in the shape of an arc around the point located outside of the ground, it is preferable that spline interpolation be used to interpolate a camera parameter if any one of the points P1, P2, and O is located on the outside of the ground.

Moreover, a configuration is also possible in which, if either of the point P1 and the point P2 is located on the reverse side with respect to the direction of the line of sight of the other virtual viewpoint (on the back side of the other virtual camera), interpolation method determination unit 315 determines spline interpolation, irrespective of a result of the determination in step S1106.

Embodiment 4

Figure 13:
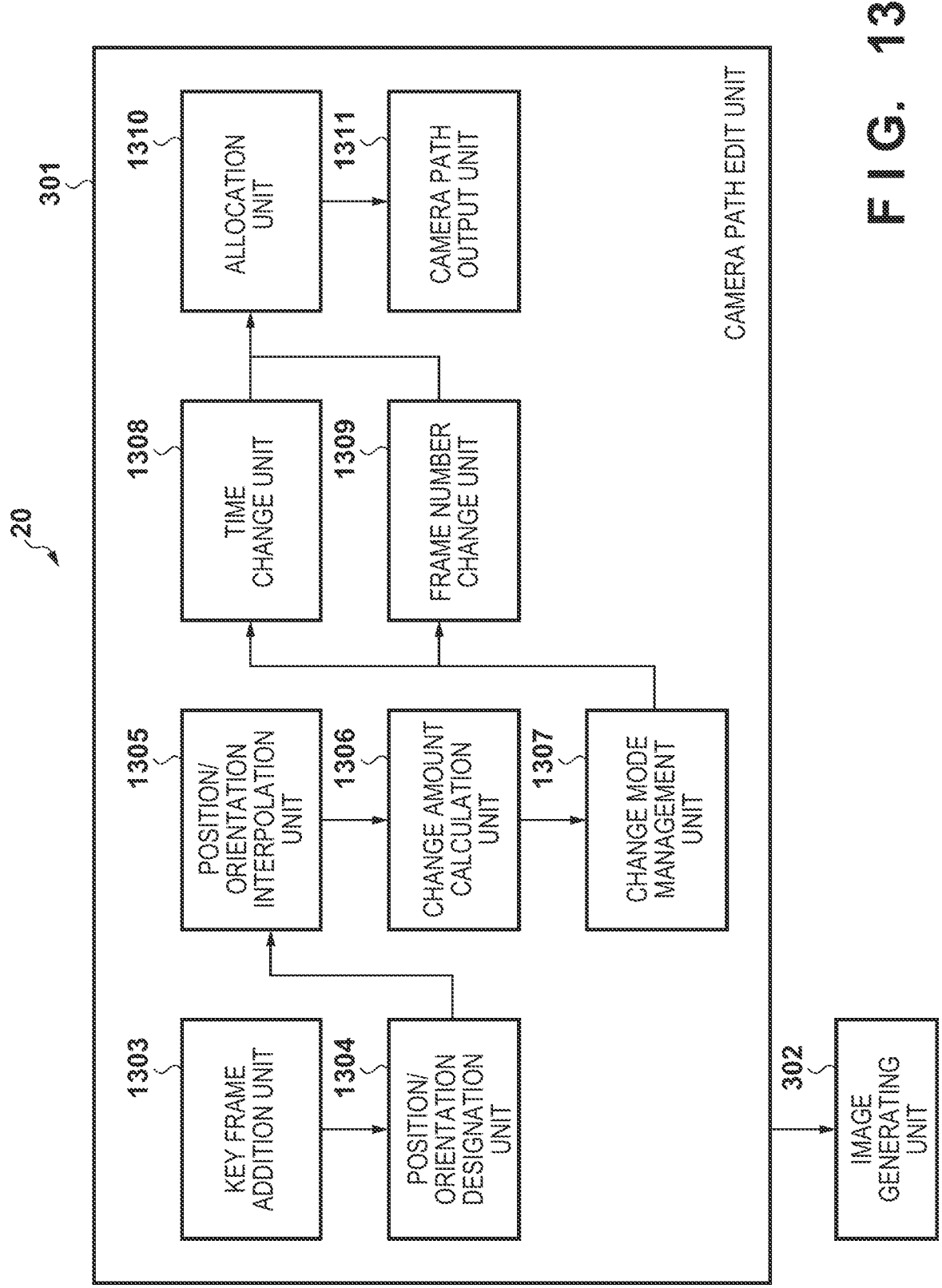
FIG. 13 is a block diagram illustrating an example of a functional configuration of an information processing apparatus according to Embodiment 4.

FIG. 13 is a block diagram illustrating an example of a functional configuration realized by an information processing apparatus 20 according to Embodiment 4. As described above, the functional units may be realized by the CPU 201 executing a predetermined computer program, or at least some of the functional units may be realized by dedicated hardware.

The camera path edit unit 301 edits a camera path that defines movement of virtual viewpoints, based on an operation performed by a user. The camera path defines movement of the virtual camera 103 in a video generated by sequentially reproducing a plurality of virtual viewpoint images or CG images. The camera path is managed by frames and timeline. "Frame" has information necessary for generating the images constituting the video, or more specifically, information relating to, for example, the time of a scene, and the position/orientation of a virtual camera. "Time of a scene" is expressed by, for example, a time code in which the time at which the competition to be captured is started is set as a 00 hour/00 minutes/00 seconds/00 frame. The position of the virtual camera is indicated by, for example, three coordinates, namely, X, Y, and Z, with the original point set within an image capturing space. The orientation of the virtual camera is indicated by, for example, three angles, namely, pan, tilt, and roll. The number of frames included in the timeline depends on the number of images (frame rate) to be reproduced per one second. For example, if the frame rate is 60 frames/second, 60 frames per one second is included in the timeline. Note that zoom (field angle) may also be included as the states of virtual viewpoints (virtual camera) indicated by the camera path.

In camera path edit using key frames, frames are classified into two types, namely, key frames and intermediate frames. "Key frames" are frames for which information is expressly designated by a user that edits a camera path. On the other hand, "intermediate frames" are frames between the key frames. The camera path edit unit 301 uses the positions/orientations of the virtual cameras designated as the key frames to calculate the position and orientations of virtual cameras between the key frames using interpolation, and determine information relating to the frames. Furthermore, the key frames are classified into three types, namely, a starting point, an ending point, and a middle point. A camera path includes one key frame (starting point), one key frame (ending point), zero or more key frames (middle point). The information processing apparatus 20 of the present embodiment performs processing on a camera path that specifically includes one key frame (middle point) or more, that is, a camera path that includes three or more key frames. Furthermore, a camera path between the key frame at the starting point and the key frame at the ending point is to be edited.

Figure 14:
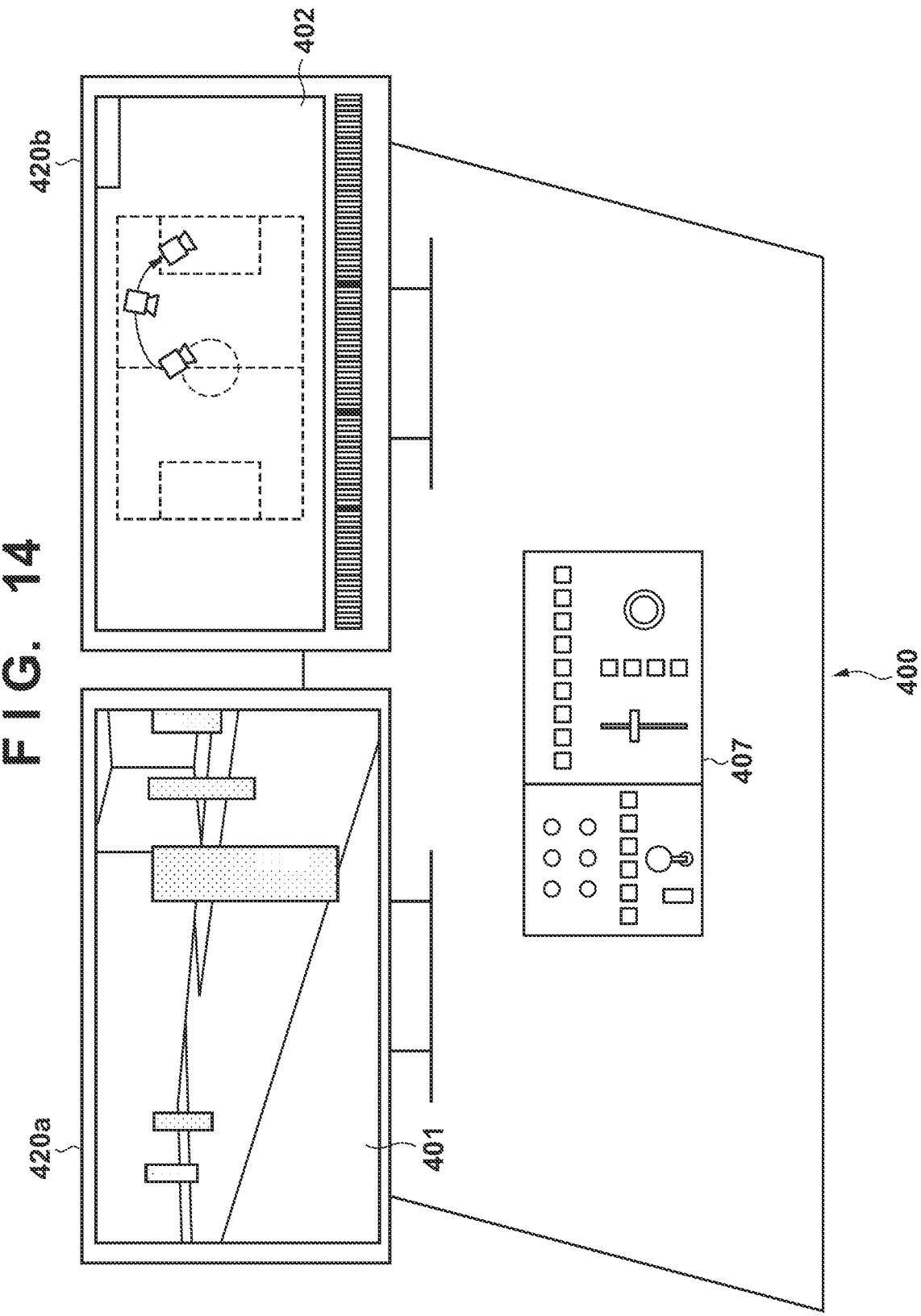
FIG. 14 is a diagram illustrating a user interface for editing a camera path.

FIG. 14 shows an example (user I/F unit 400) of a user interface (hereinafter, referred to as "UI") for editing a camera path according to the present embodiment. The image display unit 420a displays a virtual viewpoint image 401 generated by the image generating unit 302, that is, the image viewed from the virtual camera 103. The UI display unit 420b displays a UI screen 402 that includes, for example, information relating to a camera path or key frames. The edit controller 407 is a controller that is used by the user to edit a camera path.

Figure 15:
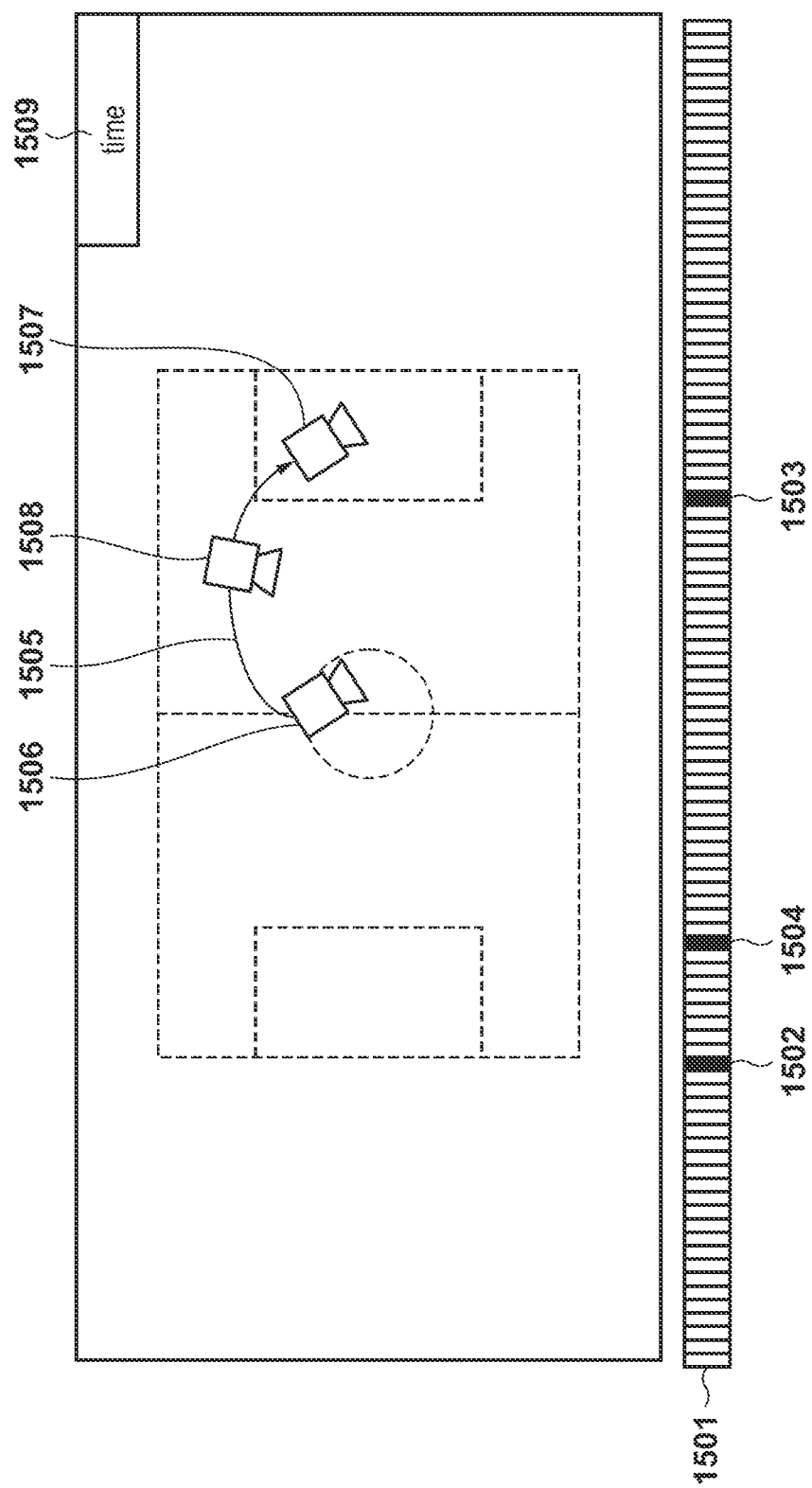
FIG. 15 is a diagram illustrating a display example of the user interface for editing a camera path.

FIG. 15 shows a display example of the UI display unit 420b. A timeline 1501 indicates frames on a single time axis. That is to say, the timeline 1501 schematically indicates a frame line of virtual viewpoint images or computer graphic images, and the positions of key frames in the frame line. In FIG. 15, three key frames, namely, a key frame 1502, a key frame 1503, and a key frame 1504 are shown. The key frame 1502 is a key frame that corresponds to the starting point of a camera path 1505. The key frame 1503 is a key frame that corresponds to the ending point of the camera path 1505. The key frame 1504 is a key frame that corresponds to the key frame at the middle point. On the other hand, the camera path 1505 indicates movement (transition) of the positions/orientations of the virtual cameras that correspond to the respective frames. The reference number 1506 denotes the state including the position/orientation of the virtual camera that corresponds to the key frame 1502. The reference number 1507 denotes the state including the position/orientation of the virtual camera that corresponds to the key frame 1503. The reference number 1508 denotes the state including the position/orientation of the virtual camera that corresponds to the key frame 1504. Also, a mode display unit 1509 displays a camera path change mode that is currently being executed. The present embodiment uses, as the camera path change mode, a time change mode and a frame number change mode, which will be described later.

Note that the camera path edit unit 301 transmits, to the image generating unit 302, information relating to the target frame to be edited by a user. The image generating unit 302 generates, based on the received frame information, a virtual viewpoint image, and causes the image display unit 420a to display the generated virtual viewpoint image 401. Accordingly, the user can edit the camera path while checking an image viewed from the virtual camera of the target frame to be edited by the user.

A key frame addition unit 1303 adds, on the timeline 1501, key frames to the time designated by the user. The user uses the edit controller 407 to perform time-related operations (advance or return), and designates predetermined time. When the user performs a time-related operation, the virtual viewpoint image of the corresponding time is displayed on the image display unit 420a. As a result of the user performing an operation while viewing the virtual viewpoint image displayed on the image display unit 420a, it is possible to easily designate desired time of the scene such as time at which a player has passed the ball. The key frames 1502, 1503, and 1504 added by the user are displayed on the timeline 1501 shown in FIG. 15. Note that, by designating a desired position on the timeline 1501 using a pointing device such as a mouse, the user can also add a key frame to the position.

A position/orientation designation unit 1304 designates the state (position/orientation) of a virtual camera of a key frame, based on an operation performed by the user. The user uses the edit controller 407 to move the virtual camera frontward, rearward, leftward, rightward, upward, or downward to designate a desired position. Furthermore, the user uses the edit controller 407 to rotate the virtual camera in a pan direction, a tilt direction, or a roll direction to designate a desired orientation. When the user operates the position/orientation of the virtual camera, the virtual viewpoint image of the corresponding position/orientation is displayed on the image display unit 420a. By performing operation while viewing the virtual viewpoint image displayed on the image display unit 420a, the user can easily designate the position/orientation of a desired virtual camera. The position/orientations of the virtual cameras that correspond to the key frames designated by the user are displayed as states 1506, 1507, and 1508. Note that the state 1506 of the virtual camera denotes the position/orientation of the virtual camera of the key frame 1502. Similarly, the state 1508 denotes the position/orientation of the virtual camera of the key frame 1504, and the state 1507 denotes the position/orientation of the virtual camera of the key frame 1503.

A position/orientation interpolation unit 1305 interpolates the positions/orientations of cameras between the key frames. First, the region between the key frame at the starting point and the key frame at the ending point is divided into intermediate key frames. In the example of FIG. 15, the region is divided into two areas. The first area is between the key frame 1502 serving as the starting point and the intermediate key frame 1504. The second area is between the intermediate key frame 1504 and the key frame 1503 serving as the ending point. For each of the divided areas, the positions/orientations of the cameras are interpolated as a curve. For example, linear interpolation, Bezier interpolation, or the like is used as the method for interpolating positions of cameras. Furthermore, interpolation methods determined using the methods described above with reference to Embodiments 1 to 3 may also be used. Furthermore, for example, linear interpolation, spherical linear interpolation, or the like is used as the method for interpolating orientations of cameras. The interpolated curve serves as the camera path 1505.

A change amount calculation unit 1306 calculates change amounts in the state of the virtual viewpoints (virtual cameras) before and after a designated key frame (added key frame), and acquires the calculated change amounts. In the present embodiment, the change amount calculation unit 1306 calculates change amounts in the position/orientation of the cameras between the key frames. A change amount in the position of the cameras is the length of a curve/straight line obtained by inter-keyframe interpolation. The length of a curve/straight line can be calculated by integrating functions indicating the curve/straight line, for example. A change amount in the orientation of the cameras is a change amount in a pan angle, a tilt angle, or a roll angle. A change amount in a pan angle, a tilt angle, or a roll angle can be calculated as a difference between pan angles, tilt angles, or roll angles of adjacent key frames. Furthermore, an average of the change amounts between pan angles, tilt angles, or roll angles of key frames may be set as the change amount in the orientation of the cameras. Furthermore, in the present embodiment, change amounts in the position and orientation are synthesized into a change amount in the state (for example, synthesis using a linear sum).

A change mode management unit 1307 manages camera path change modes. One of the camera path change modes is the time change mode for changing time of key frames. Furthermore, the other mode is the frame number change mode for changing the number of intermediate frames to be inserted between key frames. The user can perform, using the edit controller 407, switching between the time change mode and the frame number change mode to a desired mode. In both modes, the position of a designated key frame in the frame line of virtual viewpoint images or CG images is changed so that the difference between the change amounts acquired by the change amount calculation unit 1306 between before and after the designated key frame is reduced. A time change unit 1308 operates in the time change mode, and changes time of an added key frame so that the difference between the change amounts in the virtual viewpoints between before and after the added key frame is reduced. A frame number change unit 1309 operates in the frame number change mode, and changes the number of intermediate frames between an added key frame and the key frame adjacent thereto so that the difference between the change amounts in the virtual viewpoints between before and after the added key frame is reduced. The following will describe operations of the time change unit 1308 and the frame number change unit 1309.

Time Change Mode

Depending on the change amount in the virtual viewpoint state (for example, the change amount in the position/orientation) between key frame, the time change unit 1308 changes time of an added key frame, so that the difference between the change amounts before and after the key frame is reduced. More specifically, the time change unit 1308 changes, for example, time of the key frame at the middle point, so that the per-time change amounts in the position and orientation of the camera before and after the middle point are equal to each other. Note that the time change unit 1308 operates in the time change mode for changing time of a key frame.

Figure 21A:
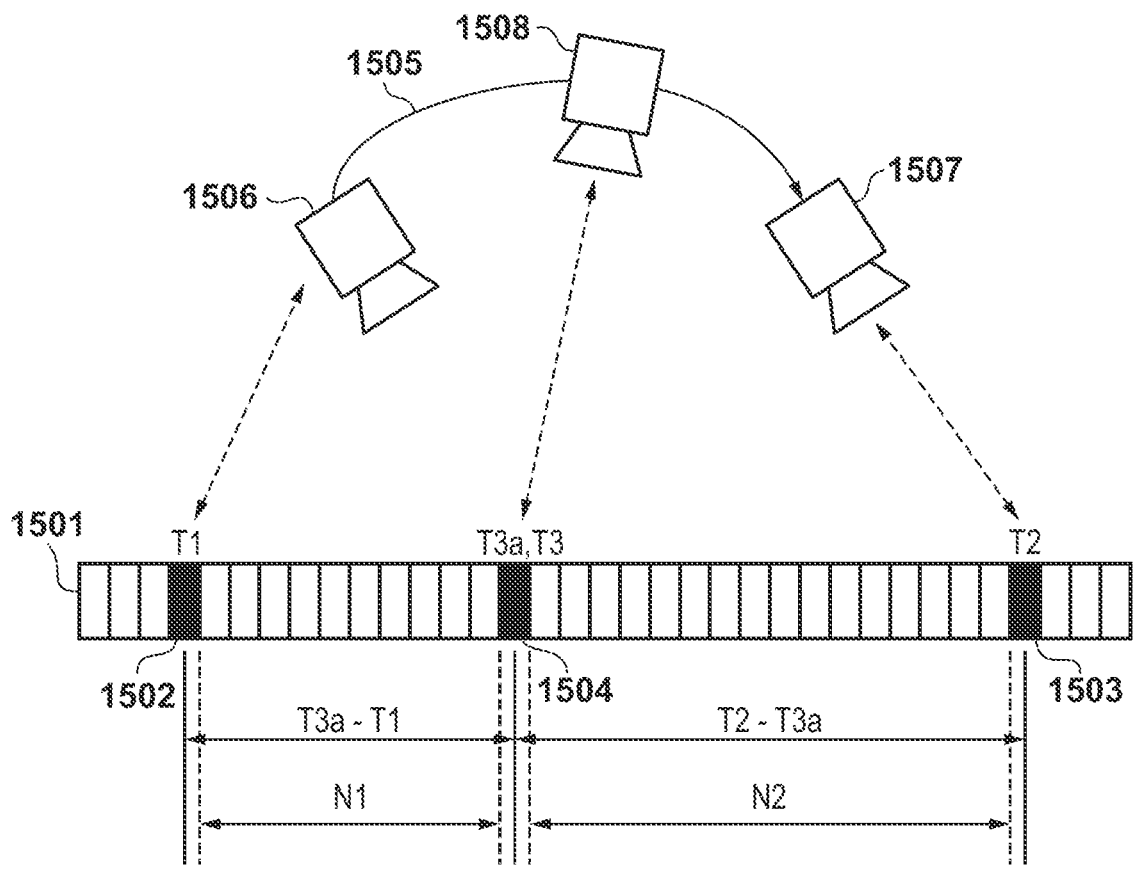
FIGS. 21A and 21B are diagrams illustrating a calculation of change amounts in the states of virtual cameras.

The following will describe a method for changing time of the key frame at the middle point in the time change mode, with reference to the example shown in FIG. 21A. FIG. 21A is a diagram illustrating a calculation of change amounts in the virtual viewpoint state. In FIG. 21A, a change amount in the virtual viewpoint state (position/orientation of a virtual camera) between the key frame 1502 and the key frame 1504 is referred to as "L1". In other words, L1 is a change amount from the state 1506 to the state 1508 of the virtual camera. Furthermore, a change amount in a virtual viewpoint state (position/orientation of a virtual camera) between the key frame 1504 and the key frame 1503 is referred to as "L2". In other words, L2 is a change amount from the state 1508 to the state 1507 of the virtual camera. Furthermore, "T1" refers to time of the key frame 1502, "T2" refers to time of the key frame 1503, and "T3a" refers to time after the key frame 1504 has been changed.

Before the key frame 1504, a per-time change amount $\Delta L1$ in the position/orientation of the virtual camera is $L1/(T3a-T1)$. Furthermore, after the key frame 1504, a per-time change amount $\Delta L2$ in the position/orientation of the virtual camera is $L2/(T2-T3a)$. Accordingly, in order that the per-time change amounts $\Delta L1$ and $\Delta L2$ in the position/orientation of the virtual camera before and after the key frame 1504 are equal to each other, it is sufficient to set the time T3a of the key frame 1504 so that $L1/(T3a-T1)=L2/(T2-T3a)$ is satisfied. Accordingly, for the time T3a of the key frame 1504, time $T3a=(L1 \times T2+L2 \times T1)/(L1+L2)$ is given. If the time of the key frame 1504 is changed, the key frame 1504 will be moved on the timeline 1501. Note that the state 1508 (position/orientation) of the virtual camera in the key frame 1504 does not change. Note that $\Delta L1$ and $\Delta L2$ do not necessarily match each other, and it is sufficient that the difference between $\Delta L1$ and $\Delta L2$ is smaller after the time of the key frame 1504 is changed than the difference between $\Delta L1$ and $\Delta L2$ before the change.

A change amount in the position of a virtual camera is equal to the moving speed of the virtual camera. According to the above-described processing, the difference in the moving speed of the virtual camera is reduced between before and after the key frame 1504, or the moving speeds of the virtual camera before and after the key frame 1504 are equal to each other. Therefore, it is possible to mitigate unnaturalness caused due to a change in the moving speed of the virtual camera between before and after the key frame, without a user additionally adjusting the moving speed of the virtual camera.

Note that the state of a virtual viewpoint (virtual camera) refers to at least either of the position and the orientation of the virtual viewpoint (virtual camera). In other words, as the change amounts L1 and L2 in the state of the virtual camera, only the change amount in the position of the virtual camera may be used, or only the change amount in the orientation of the virtual camera may be used. Alternatively, as the change amounts L1 and L2, only the change amount in at least one of pan, tilt, and roll of the orientation of the virtual camera may be used. Furthermore, if combinations of the position and orientation of the virtual camera are used as the change amounts L1 and L2, for example, values obtained by performing linear combination on the change amounts.

Furthermore, a configuration is also possible in which, if the difference in the per-time change amount in the state (for example, the position and orientation) of the virtual camera between before and after the key frame at the middle point is equal to or larger than a predetermined value, the time of the key frame at the middle point may be changed. For example, if the ratio in the per-time change amount in the position/orientation of the camera between before and after the key frame at the middle point is larger than 0.8, the time of the key frame (middle point) is changed to T3a described above. In this case, the following formula (Formula 1) is used to determine whether or not to change the time of the key frame.

$$0.85 \leq \{L1(T2-T3)\}/\{L2(T3-T1))\} \leq 1/0.8 \quad \text{(Formula 1)}$$

Where T3 is time before the key frame 1504 is changed. If Formula 1 is not met, the time change unit 1308 changes the time of the key frame at the middle point added according to the above-described method to T3a.

Figure 21B:
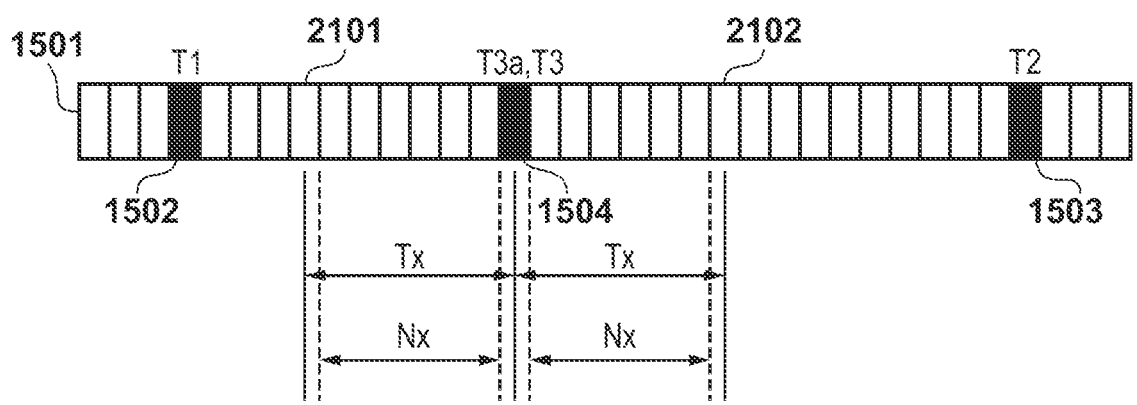

Furthermore, the change amount calculation unit 1306 may use frames (intermediate frames or key frames) within a predetermined time before and after the key frame at the middle point to calculate the change amounts L1 and L2 in the position/orientation of the virtual camera in the key frame at the middle point. For example, as shown in FIG. 21B, the change amount calculation unit 1306 calculates the change amount L1, based on the state of the virtual viewpoint of a frame 2101 before the predetermined time (T3a−Tx) from the key frame 1504 at the middle point, and the state of the virtual viewpoint of the key frame 1504. Also, the change amount calculation unit 1306 calculates the change amount L2, based on the state of the virtual viewpoint of a frame 2102 after the predetermined time (T3a+Tx) from the key frame 1504, and the state of the virtual viewpoint of the key frame. Note that the states (position/orientation of the virtual camera) of the virtual viewpoints that correspond to the frames 2101 and 2102 are acquired by the position/orientation interpolation unit 1305. The time change unit 1308 determines the time T3a so that thus calculated L1 and L2 are equal to each other. Note that, in the example above, the same predetermined time Tx is used before and after the designated key frame 1504 at the middle point, but different times may also be used before and after the key frame 1504. Also, the key frames 1502 and 1503 at the times T1 and T2 are respectively set as the key frame at the starting point and the key frame at the ending point, but the present invention is not limited to this. In other words, the above-described processing in the time change mode may also be executed using the key frames adjacent to both sides of the added key frame 1504.

Frame Number Change Mode

The frame number change unit 1309 changes the number of intermediate frames between key frames so that the difference in the per-frame change amount in the state (position/orientation) of the virtual camera between the key frames is reduced. Specifically, in the present embodiment, the frame number change unit 1309 changes the number of intermediate frames so that the per-frame change amounts in the state (position/orientation) of the virtual camera before and after the key frame at the middle point are equal to each other. Note that the frame number change unit 1309 operates in the frame number change mode for changing the number of intermediate frames between key frames. Note that the state (virtual viewpoint state) of the virtual camera is as described above.

The following will describe operation in the frame number change mode with reference to the example of FIG. 21A. In FIG. 21A, it is assumed that the number of intermediate frames between the key frame 1502 and the key frame 1504 before being changed is defined as "N1", and the number of intermediate frames between the key frame 1504 and the key frame 1503 before being changed is defined as "N2". Furthermore, it is assumed that time of the key frame 1504 is defined as "T3". The number of intermediate frames before being changed depends on the difference in the time and the frame rate between the key frames. For example, if it is assumed that the frame rate is 60 frames/second, N1=(T3−T1)×60−1, and N2=(T2−T3)×60−1 are given.

Here, it is assumed that the number of intermediate frames between the key frame 1502 and the key frame 1504 after having been changed is defined as "N1a". Furthermore, it is assumed that the number of intermediate frames between the key frame 1504 and the key frame 1503 after having been changed is defined as "N2a". Thus, the per-frame change amount in the state (position/orientation) of the virtual camera after the key frame 1504 is L 1/N a. Also, the per-frame change amount in the state (position/orientation) of the virtual camera after the key frame 1504 is L2/N2a. Accordingly, the condition that the per-frame change amounts in the state (position/orientation) of the virtual camera before and after the key frame 1504 are equal to each other is L1/N1a=L2/N2a.

Then, the frame number change unit 1309 determines whether the number of intermediate frames is changed before or after the key frame 1504. In the present embodiment, a frame is added to a position before or after the designated frame at which the change amount is larger. More specifically, the frame number change unit 1309 compares, for example, the per-time change amounts before and after the key frame 1504, and changes the number of intermediate frames on the side on which the change amount is larger, and does not change the number of intermediate frames on the side on which the change amount is smaller. Note that the number of frames may also be changed if the difference in the per-frame change amounts in the state (for example, the position/orientation) of the virtual camera between before and after the key frame at the middle point is equal to or larger than a predetermined value.

Hereinafter, detailed description will be given. The per-time change amount ΔL1 in the state of the virtual camera before the key frame 1504 is given as L1/(T3−T1). Also, the per-time change amount ΔL2 in the state of the virtual camera after the key frame 1504 is given as L2/(T2−T3). Here, it is assumed, for example, that the per-time change amount ΔL1 before the key frame 1504, that is, between the key frame 1502 and the key frame 1504 is larger than the change amount ΔL2 after the key frame 1504. In this case, the frame number change unit 1309 changes the number of intermediate frames between the key frame 1502 and the key frame 1504 but not change the number of intermediate frames between the key frame 1504 and the key frame 1503. Accordingly, N2a=N2=(T2−T3)×60−1, and N1a=L1/L2× N2a=L1/L2×((T2−T3)×60−1 are given. Where, N1a>N1 is met, and the frame number change unit 1309 adds "N1a−N1" intermediate frames between the key frame 1502 and the key frame 1504. Note that ΔL1 and ΔL2 do not necessarily match each other, and it is sufficient that the difference between ΔL1 and ΔL2 is smaller after the number of intermediate frames is changed than the difference between ΔL1 and ΔL2 before the change.

Note that, according to the above-described processing, a video will be reproduced with the same speed after the key frame 1504 on which the number of intermediate frames is not changed, whereas a video will be reproduced in slow motion before the key frame 1504 on which the intermediate frame has been added. However, the per-frame change amounts (e.g., moving speeds) in the state of the virtual camera before and after the key frame 1504 are equal to each other, or the difference therebetween is small. Therefore, it is possible to mitigate unnaturalness caused due to a change in the moving speed of the virtual camera between before and after the added key frame, without a user additionally adjusting the moving speed or the like of the virtual camera.

Note that the method for changing the number of intermediate frames is not limited to adding a frame, but may also be performed by removing a frame. For example, if the change amount ΔL1 before the key frame 1504 is larger than the change amount ΔL2 after the key frame 1504, the frame number change unit 1309 may reduce the number of intermediate frames between the key frame 1504 and the key frame 1503.

Note that the intermediate frame adding method may be realized by, for example, repeating a suitable intermediate frame between key frames. Furthermore, similar to the time change mode, also in the frame number change mode, using the frame that corresponds to the predetermined time before and after an added key frame, the difference between the change amounts in the state before and after the key frame may be reduced. In other words, in FIG. 21(b), this is realized by using time (T3−Tx) before the predetermined time of the designated key frame 1504 as T1, and using time (T3+Tx) after the predetermined time of the designated key frame 1504 as T2. Furthermore, in this case, the frame number change unit 1309 increases and reduces the number of frames between the key frame 1504 and the frame 2101 before the predetermined time thereof, or the number of frames between the key frame 1504 and the frame 2102 after the predetermined time thereof, so as to reduce the difference in the change amount. Furthermore, in the description above, the same predetermined time Tx was used between before and after the designated key frame 1504 at the middle point, but different times between before and after the key frame 1504 may also be used. Also, the key frames 1502 and 1503 at the times T1 and T2 are respectively defined as the key frames at the starting point and the ending point, but the present invention is not limited to this configuration. In other words, the above-described processing in the time change mode may also be executed using the key frames adjacent to both sides of the added key frame 1504.

Allocation of Position and Orientation

An allocation unit 1310 allocates the position/orientation of a camera to the intermediate frame defined through the time change unit 1308 or the frame number change unit 1309. For example, allocation of the states (positions/orientations) of virtual cameras to the N1 intermediate frames is performed in the following manner. First, the allocation unit 1310 divides the camera path 1505 between the state 1506 of the virtual camera of the key frame 1502 and the state 1508 of the virtual camera of the key frame 1504 into N1+1, and sequentially allocates the states of the virtual cameras at the divided points to the N1 intermediate frames. Similarly, the states (positions/orientations) of the virtual cameras can also be allocated to the intermediate frames between the key frame 1504 and the key frame 1503.

Also, when the number of intermediate frames between key frames is changed, the allocation unit 1310 also again allocates times to the intermediate frames. For example, when the number of intermediate frames is changed from N1 to N1a, the allocation unit 1310 allocates the positions/orientations of the cameras to the N1a intermediate frames, and allocates again time of the intermediate frames in the following manner. First, the allocation unit 1310 equally divides time between the key frame 1502 and the key frame 1504 into N1a+1. Then, the allocation unit 1310 sequentially allocates time at the divided positions to the N a intermediate frames. On the other hand, with respect to the area in which the number of intermediate frames is not changed, it is not necessary to allocate time again.

A camera path output unit 1311 outputs a camera path constituted by the key frames and the intermediate frames.

The image generating unit 302 moves the virtual viewpoint along the camera path output by the camera path output unit 1311, and generates a virtual viewpoint image.

Operation in Time Change Mode

Figure 16:
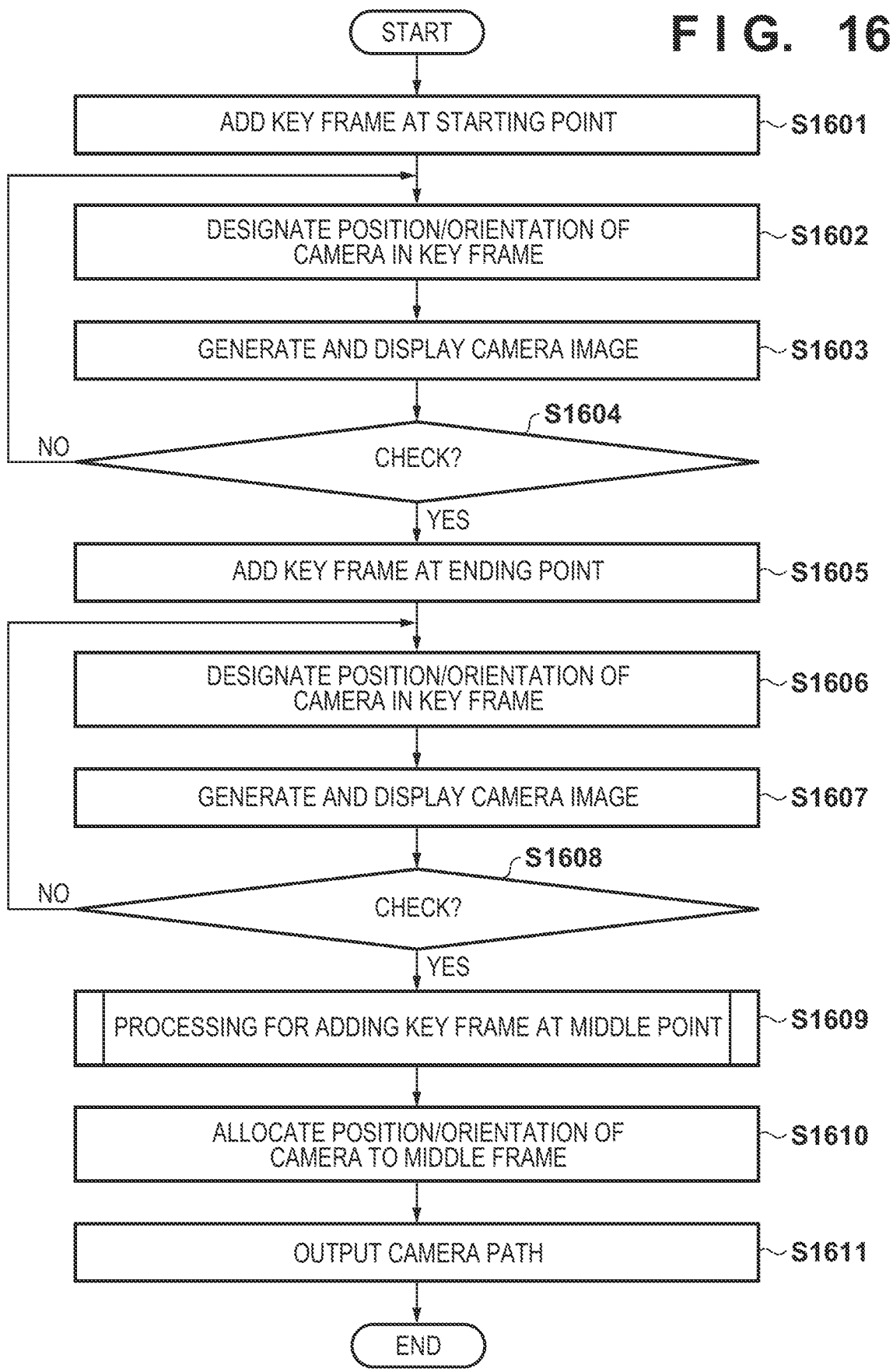
FIG. 16 is a flowchart illustrating camera path edit processing.

FIG. 16 is a flowchart illustrating a procedure of processing performed by the information processing apparatus 20 according to the present embodiment. Processing performed when the time change mode has been selected by the change mode management unit 1307 will be described.

In step S1601, the key frame addition unit 1303 adds the key frame at the starting point, in response to an operation performed by a user. For example, if the user selects, using the edit controller 407, desired time on the timeline 1501, the key frame at the starting point will be added to this time. Furthermore, the camera path edit unit 301 displays the added key frame (for example, the key frame 1502) at the starting point on the timeline 1501.

In step S1602, the position/orientation designation unit 1304 designates the position/orientation as the state of the virtual camera of the key frame at the starting point in accordance with the operation performed by the user. For example, using the edit controller 407, the user moves the virtual camera frontward, rearward, leftward, rightward, upward, or downward, or rotates the virtual camera in a pan, tilt, or roll direction, to designate the position/orientation of the virtual camera. In step S1603, the camera path edit unit 301 transmits the information regarding the time of the key frame at the starting point and the position/orientation of the camera to the image generating unit 302. The image generating unit 302 generates, based on the received time of the key frame and the position/orientation of the virtual camera, a virtual viewpoint image. The generated virtual viewpoint image is transmitted to the image display unit 420a, and is displayed thereon.

The user views the virtual viewpoint image displayed on the image display unit 420a, and checks whether or not the position/orientation of the camera of the key frame at the starting point is correct. If it is determined that it is correct, the user notifies, using the edit controller 407, the camera path edit unit 301 of the fact that it is correct. Upon being notified of the fact that it is correct, the camera path edit unit 301 determines that it is correct (Yes in step S1604), the procedure moves to step S1605. If it is determined that the position/orientation of the camera of the key frame at the starting point is not correct, the user designates again, using the edit controller 407, the position/orientation of the virtual camera. If, using the edit controller 407, the position/orientation of the virtual camera is designated again, the camera path edit unit 301 determines that it is not correct (No in step S1604), the procedure returns to step S1602.

In step S1605, the key frame addition unit 1303 adds the key frame at the ending point in accordance with an operation performed by the user. The specific procedure thereof is the same as that in step S1601. In step S1606, the position/orientation designation unit 1304 designates the position/orientation of the virtual camera of the key frame at the ending point in accordance with an operation performed by the user. The specific procedure thereof is the same as that in step S1602. In step S1607, in the same procedure as in step S1603, a virtual viewpoint image is generated that corresponds to the time and the position/orientation of the virtual camera of the key frame at the ending point, and is displayed on the image display unit 420a.

The user views the virtual viewpoint image displayed on the image display unit 420a, and checks whether or not the position/orientation of the camera of the key frame at the ending point is correct, and indicates the check result using the edit controller 407. Similar to step S1604, if it is determined by the camera path edit unit 301 that it is correct (Yes in step S1608), the procedure moves to step S1609, and if it is determined that it is not correct (No in step S1608), the procedure returns to step S1606.

In step S1609, the key frame addition unit 1303 performs processing for adding the key frame at the middle point, in accordance with an operation performed by user using the edit controller 407. Details of the adding processing will be described later with reference to the flowchart shown in FIG. 17. In step S1610, the allocation unit 1310 allocates the camera path 1505 obtained through inter-keyframe interpolation to the position/orientation of the virtual camera of the middle frame. In step S1611, the camera path output unit 1311 outputs the camera path constituted by the key frames and the intermediate frame.

Figure 17:
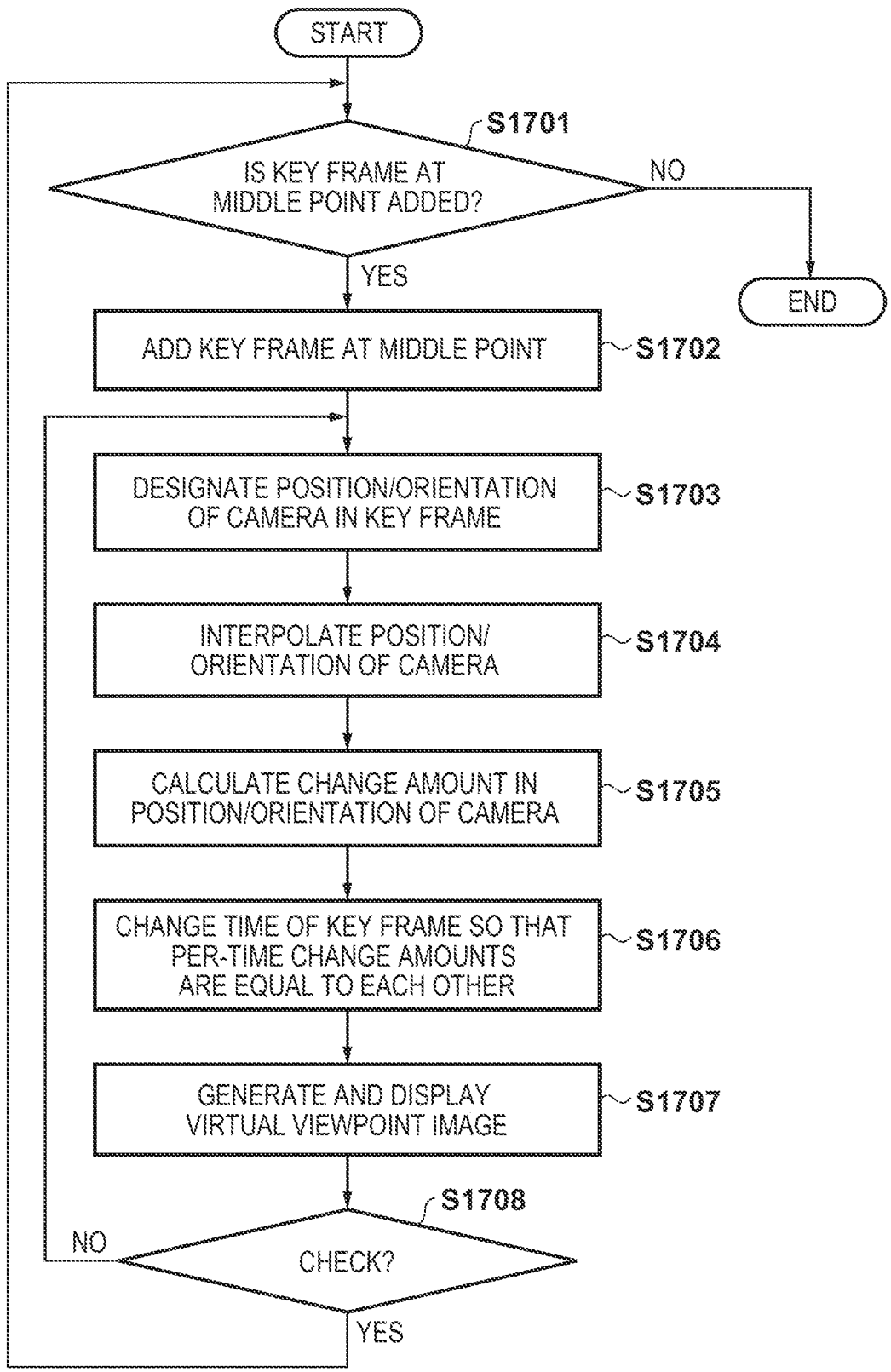
FIG. 17 is a flowchart illustrating camera path edit processing using a time change mode.

FIG. 17 is a flowchart illustrating the procedure, in the time change mode, of the key frame adding processing in step S1609 shown in FIG. 16. First, in step S1701, the key frame addition unit 1303 determines whether or not the key frame at the middle point has been added. If it is determined that the key frame at the middle point has been added (Yes in step S1701), the procedure moves to step S1702. If it is determined that the key frame at the middle point has not been added (No in step S1701), the present procedure is ended. In steps S1702 onward, the camera path edit unit 301 performs processing for adding the key frame (middle point).

In step S1702, the key frame addition unit 1303 adds the key frame at the middle point in accordance with an operation performed by the user. The specific procedure is the same as that in step S1601. In step S1703, the position/orientation designation unit 1304 designates the position/orientation, as the state of the virtual camera of the key frame at the middle point in accordance with an operation performed by the user. The specific procedure is the same as that in step S1602. In step S1704, the position/orientation interpolation unit 1305 interpolates the positions/orientations of the camera between the key frames. Furthermore, the camera path edit unit 301 displays the interpolated positions/orientations of the camera, serving as the camera path 1505, on the UI screen 402.

In step S1705, the change amount calculation unit 1306 calculates change amounts in the position/orientation of the virtual cameras between the key frames before and after the added key frame at the middle point. In step S1706, the time change unit 1308 changes the time of the key frame (middle point) based on the change amounts in the position/orientation of the cameras between the key frames. As described above, the time change unit 1308 changes the time of the key frame at the middle point so that the per-time change amounts in the position/orientation of the virtual camera before and after the key frame at the middle point are equal to each other, or the difference therebetween is small. Also, the camera path edit unit 301 updates the display of the timeline 1501 in accordance with the change in time of the key frame at the middle point.

In step S1707, the image generating unit 302 generates, in the same procedure as that in step S1603, a virtual viewpoint image that corresponds to the time and the position/orientation of the virtual camera of the key frame at the middle point added in step S1701, and causes the image display unit 420a to display the virtual viewpoint image. The user views the virtual viewpoint image displayed on the image display unit 420a, and checks whether or not it is correct. In step S1708, it is determined in the same procedure as that in step S1604 whether or not it is correct, and if it is determined that it is correct (Yes in step S1708), the present procedure is ended. If it is determined that it is not correct (No in step S1708), the procedure returns to step S1702.

Figure 18A:
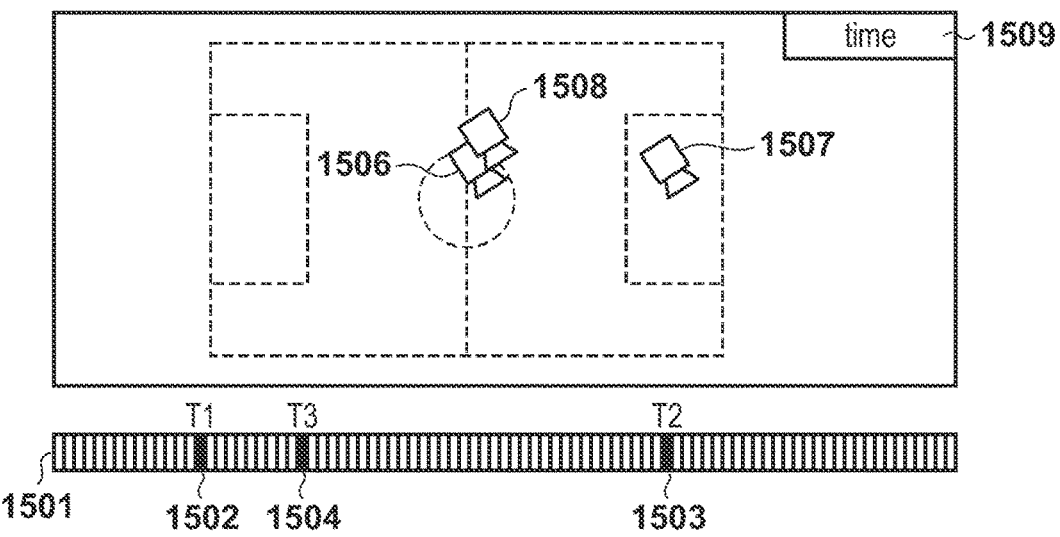
FIGS. 18A to 18C are diagrams illustrating an example of camera path edit by changing key frame time.
Figure 18B:
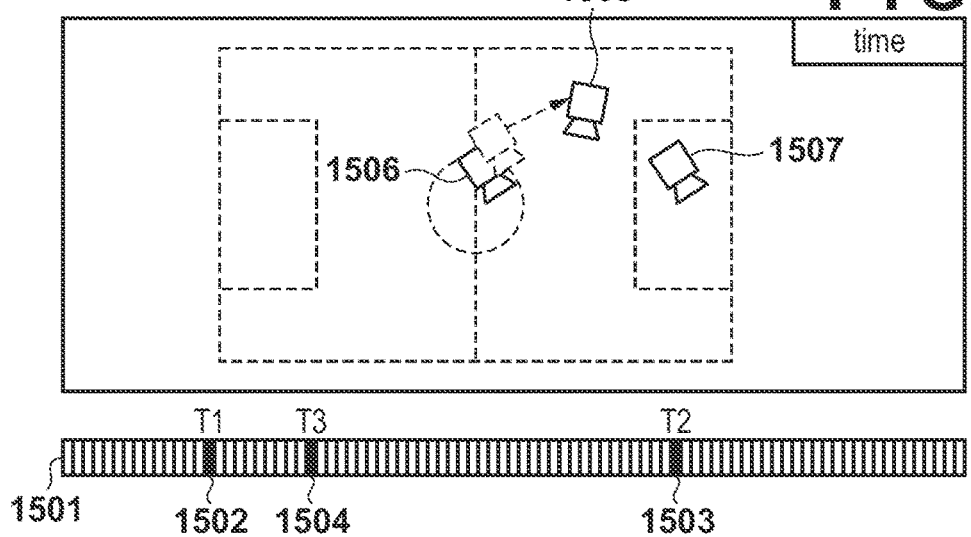
Figure 18C:
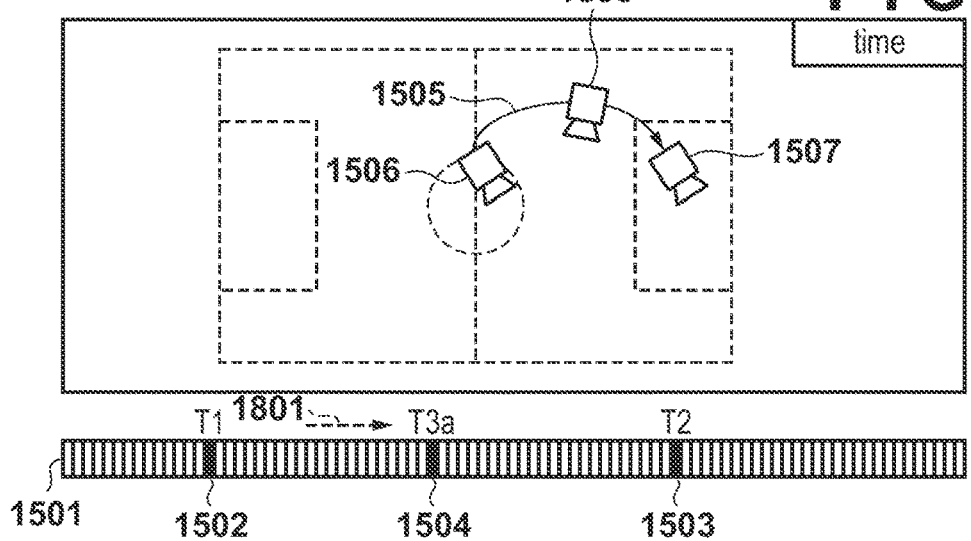

With reference to FIGS. 18A to 18C, an example of an operation performed when a time change mode for changing the time of a key frame is set as the camera path change mode will be described. Note that it is assumed that the designation of the positions/orientations of the cameras of the key frames at the starting point and the ending point is complete. In the timeline 1501, the key frame 1502 is time of the key frame at the starting point and the key frame 1503 is time of the key frame at the ending point. Furthermore, the state 1506 indicates the position and orientation of the virtual camera of the key frame at the starting point, and the state 1507 indicates the position and orientation of the virtual camera of the key frame at the ending point. Furthermore, the mode display unit 1509 indicates "time", which means the time change mode.

FIG. 18A shows the state (step S1702) in which the key frame 1504 at the middle point has newly been added. The state 1508 indicates the position and orientation of the virtual camera in the key frame 1504 at the middle point. Since, at this point in time, the position/orientation of the virtual camera of the key frame 1504 is not designated, for example, the value of the key frame 1502 at the starting point is assumed to be used as an initial value of the position/orientation of the virtual camera. Note that, as the position/orientation of the virtual camera in the added key frame, the position/orientation of the camera of the key frame leftward adjacent to the added key frame may be used, or the position/orientation of the virtual camera of the key frame closest to the added key frame may be used.

FIG. 18B shows display content when the state 1508 of the virtual camera has been designated with respect to the key frame 1504 (step S1703). FIG. 18C shows display content when the time of the key frame 1504 has been changed in steps S1704 to S1706. If the state 1508 (position/orientation) of the virtual camera of the key frame 1504 is designated (step S1703), the position/orientation interpolation unit 1305 interpolates the positions/orientations of virtual cameras between the key frames (step S1704), and a result thereof is displayed as the camera path 1505. Then, the time change unit 1308 changes the time of the key frame 1504 from T3 to T3a so that the per-time change amounts in the position/orientation of the virtual camera between the key frames are equal to each other (steps S1705 to S1706). As a result of the time being changed, the key frame 1504 moves on the timeline 1501 as indicated by an arrow 1801. In other words, the position of the key frame 1504 in the frame line of the virtual viewpoint image is changed. Note however that the state 1508 (position/orientation) of the virtual camera of the key frame 1504 is not changed.

Note that, after the time of the key frame 1504 having been changed, there may be a case in which the state within the image capturing space (such as the position of the subject) is changed, and the positions/orientations of the virtual cameras may be deviated from the initial intention of the user. However, by repeating changing of the time of the key frame 1504 with short intervals (for example, 1/60 seconds), the user can check the change in the state in real time. Accordingly, the user can appropriately update their intention in the restriction that change amounts in the state of the virtual cameras before and after the key frame 1504 are within a predetermined range (moving speed is within a predetermined range), and effectively and easily designate the state 1508 of the virtual camera.

Operation in Frame Number Change Mode

Figure 19:
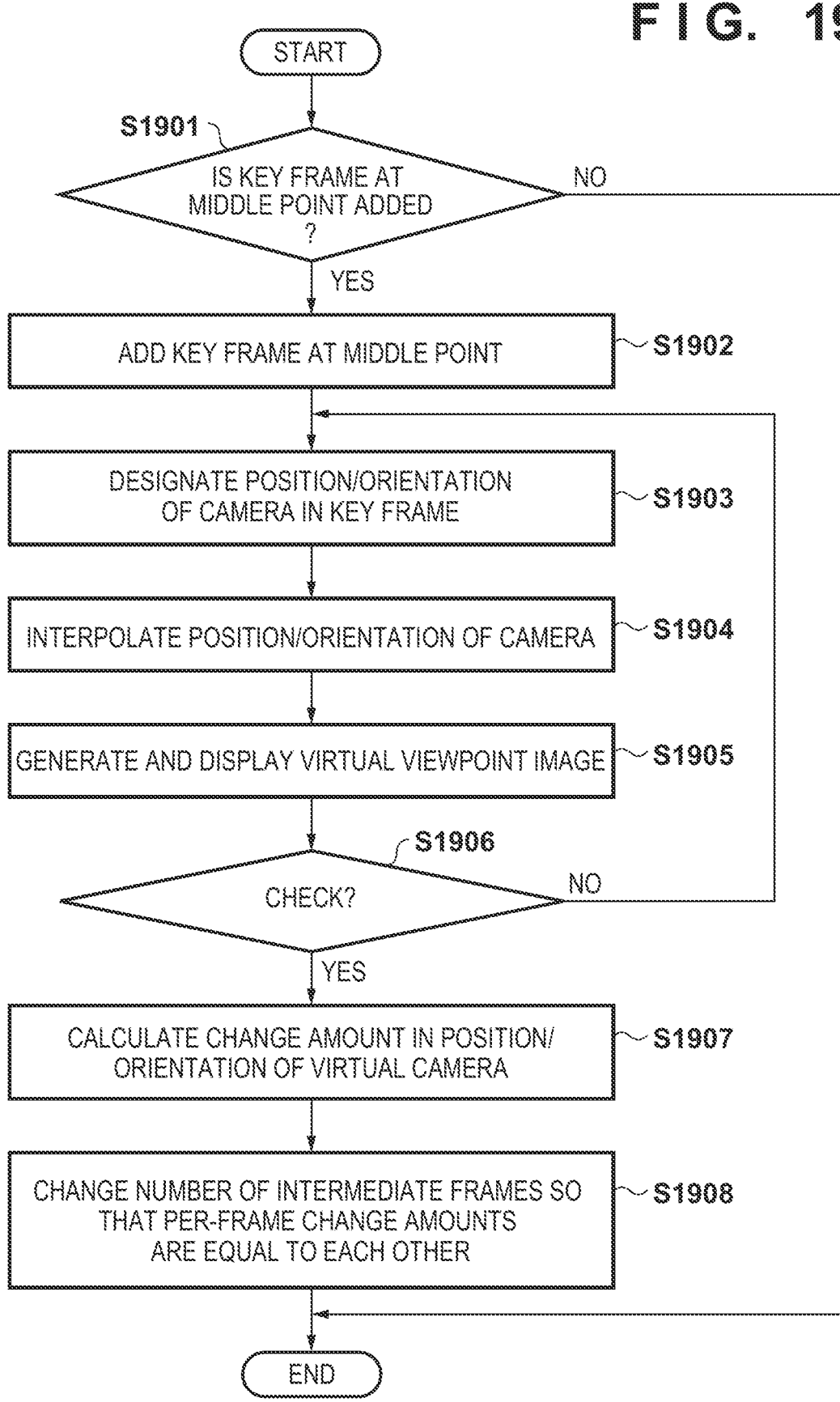
FIG. 19 is a flowchart illustrating camera path edit processing using a frame number change mode.

FIG. 19 is a flowchart illustrating the procedure, in the frame number change mode, of the key frame adding processing in step S1609 shown in FIG. 16. The following will describe, with reference to FIG. 19, operation that is performed when the frame number change mode for changing the number of intermediate frames to be interpolated between key frames is selected as the camera path change mode. Note that processing for setting key frames at the starting point and the ending point, and processing for allocating, after having set a key frame at the middle point, the positions/orientations of cameras to intermediate frames, and processing for outputting a camera path are the same as those in the time change mode (FIG. 16).

When the key frame addition unit 1303 has added the key frame at the middle point in accordance with an operation performed by the user (Yes in step S1901), the key frame addition unit 1303 adds, in step S1902, the key frame at the middle point in accordance with the operation performed by the user. In step S1903, the position/orientation designation unit 1304 designates the position/orientation as a state of the virtual camera for the key frame at the middle point, in accordance with an operation performed by the user. In step S1904, the position/orientation interpolation unit 1305 interpolates positions/orientations of virtual cameras between the key frames. Furthermore, the camera path edit unit 301 displays the interpolated positions/orientations of the cameras serving as the camera path 1505 on the UI screen 402. Processing from steps S1901 to S1904 is the same as that of steps S1701 to S1704 described with reference to FIG. 17.

In step S1905, the image generating unit 302 generates a virtual viewpoint image that corresponds to the time and the position/orientation of the virtual camera of the key frame at the middle point, and causes the image display unit 420a to display the generated virtual viewpoint image. The processing in step S1905 is the same as that in step S1603. In step S1906, the user views the virtual viewpoint image displayed on the image display unit 420a, and checks whether or not it is correct. With the same procedure as that in step S1604, it is determined whether or not it is correct, and if it is determined that it is correct (Yes in step S1906), the procedure moves to step S1907, and if it is determined that it is not correct (No in step S1906), the procedure returns to step S1903.

In step S1907, the change amount calculation unit 1306 calculates change amounts in the position/orientation of the virtual cameras between the key frames. In step S1908, the frame number change unit 1309 changes the number of intermediate frames to be inserted based on the change amounts in the position/orientation of the virtual cameras between the key frames. As described above, the frame number change unit 1309 of the present embodiment changes the number of intermediate frames so that per-frame change amounts in the position/orientations of the virtual camera before and after the key frame at the middle point are equal to each other.

Figure 20A:
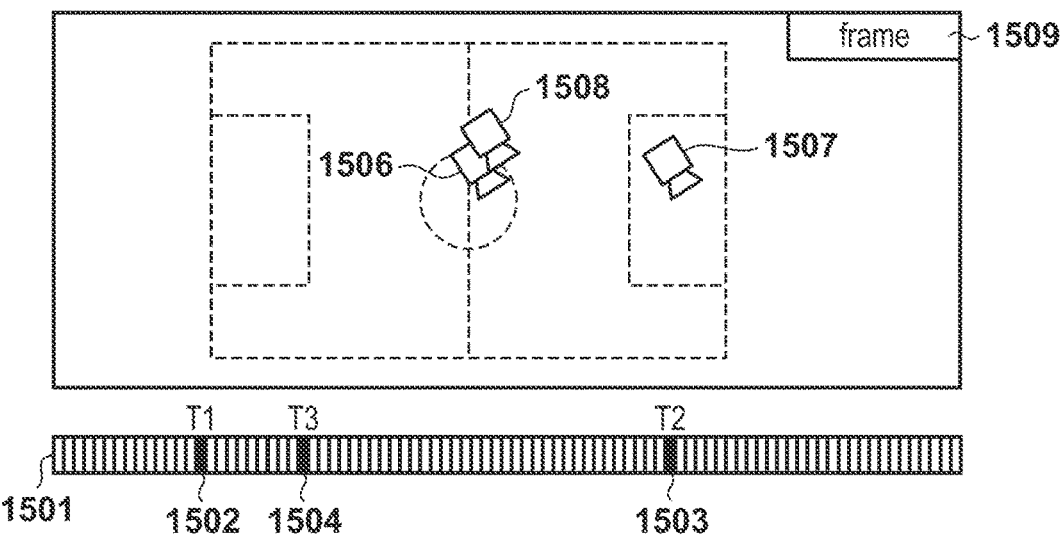
FIGS. 20A to 20C are diagrams illustrating an example of camera path edit by changing the frame number.
Figure 20B:
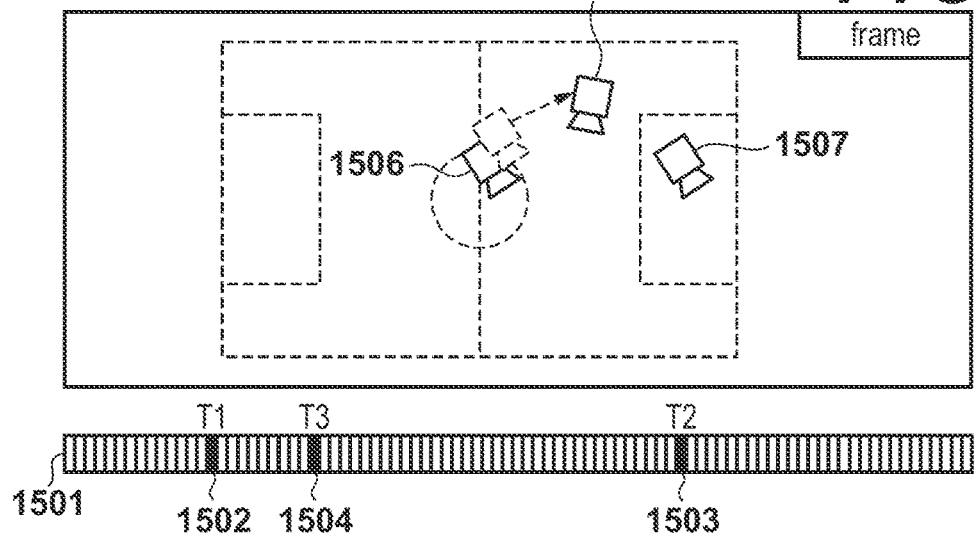
Figure 20C:
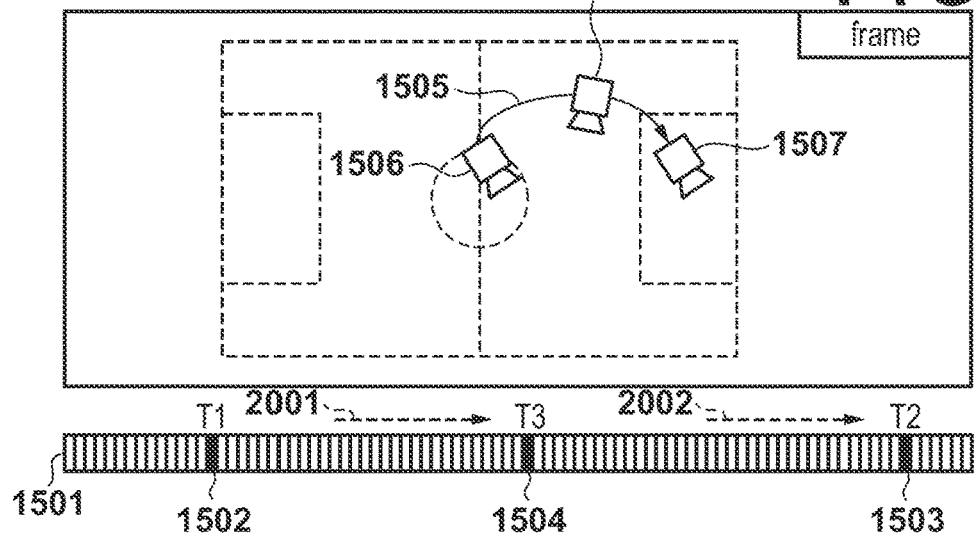

With reference to FIGS. 20A to 20C, a specific example when the frame number change mode for changing the number of intermediate frames to be inserted between key frames is set will be described. Note that FIG. 20A shows the state before the position/orientation of the virtual camera that correspond to an added key frame is designated, and shows the same display state as that in FIG. 18A. Also, FIG. 20B shows the state immediately after the position/orientation of the virtual camera that correspond to the added key frame has been designated, and shows the same display state as that in FIG. 18B. In FIG. 20, the mode display unit 1509 indicates "frame", which means the frame number change mode.

FIG. 20C displays the state after the number of intermediate frames between the key frames has been changed. First, upon the state 1508 (position/orientation) of the virtual camera of the key frame 1504 having been designated, the position/orientation interpolation unit 1305 interpolates the positions/orientations of virtual cameras between the key frames, and displays the camera path 1505 obtained through the interpolation. Then, the frame number change unit 1309 changes the number of intermediate frames so that the per-frame change amounts in the position/orientation of the virtual camera between the key frames are equal to each other, or the difference therebetween is small. In this example, an intermediate frame is added between the key frame 1502 and the key frame 1504. As a result of the intermediate frame being added, the key frame 1504 moves on the timeline 1501 as indicated by an arrow 2001. In other words, the position of the key frame 1504 in the frame line of the virtual viewpoint image is changed. As a result, the key frame 1503 moves on the timeline 1501 as indicated by an arrow 2002. Note that the times of the key frame 1502 at the starting point, the key frame 1504 at the middle point, and the key frame 1503 at the ending point are not changed. Furthermore, the number of intermediate frames between the key frame 1504 at the middle point and the key frame 1503 at the ending point is not changed.

OTHER EMBODIMENTS

The above-described time change mode and frame number change mode may also be used in combination. In other words, depending on designation of the positions and orientations of virtual viewpoints of key frames, both adding intermediate frames and changing times of the key frames may also be executed.

As described above, according to Embodiments 1 to 4, convenience of a user when setting a virtual viewpoint can be improved.

Furthermore, according to Embodiment 4, it is possible to easily set the path (movement) of virtual viewpoints for generating a virtual viewpoint image without a feeling of strangeness Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-038764, filed Mar. 4, 2019, and Japanese Patent Application No. 2019-034200, filed Feb. 27, 2019 which are hereby incorporated by reference herein in their entirety.

What is claimed is:

1. An information processing apparatus comprising:
one or more processors functioning by executing instructions stored in one or more memories as the following units:
a setting unit configured to set a plurality of key frames that each indicate a position of a virtual viewpoint that corresponds to a virtual viewpoint image generated based on images of an image capture region captured by a plurality of image capturing apparatuses from different directions;
a determination unit configured to determine, as a method for determining a moving path of a virtual viewpoint between a first key frame set by the setting unit and a second key frame set by the setting unit, a first method in a case where a position of a virtual viewpoint indicated by the first key frame and a position of a virtual viewpoint indicated by the second key frame meet a predetermined condition, and to determine, as the method, a second method different from the first method in a case where the position of the virtual viewpoint indicated by the first key frame and the position of the virtual viewpoint indicated by the second key frame do not meet the predetermined condition; and
an output unit configured to output viewpoint information that indicates the moving path of the virtual viewpoint determined based on the method determined by the determination unit.

2. The information processing apparatus according to claim 1,
wherein the plurality of key frames set by the setting unit each indicate the position of a virtual viewpoint and orientation of view from a virtual viewpoint,
the method determined by the determination unit is a method for determining transition of an orientation of view from a virtual viewpoint between the first key frame and the second key frame, and
the viewpoint information that is output by the output unit indicates the moving path of the virtual viewpoint, and the transition of the orientation of view from the virtual viewpoint.

3. The information processing apparatus according to claim 2,
wherein the method determined by the determination unit is an interpolation method for interpolating a virtual viewpoint between the first key frame and the second key frame based on the position of the virtual viewpoint and an orientation of view from the virtual viewpoint indicated by the first key frame and the position of the virtual viewpoint and an orientation of view from the virtual viewpoint indicated by the second key frame, and
the determination unit determines the moving path of the virtual viewpoint based on the interpolation method.

4. The information processing apparatus according to claim 3,
wherein the first method is circular interpolation and the second method is spline interpolation.

5. The information processing apparatus according to claim 3,
wherein the determination unit determines the method based on whether or not a first distance from the position of the virtual viewpoint indicated by the first key frame to a predetermined point and a second distance from the position of the virtual viewpoint indicated by the second key frame to the predetermined point meet the predetermined condition.

6. The information processing apparatus according to claim 5,
wherein, in a case where a difference between the first distance and the second distance is equal to or smaller than a threshold, the determination unit determines circular interpolation as the method.

7. The information processing apparatus according to claim 5,
wherein, in a case where at least one of values of the first distance and the second distance is larger than a threshold, the determination unit determines spline interpolation as the method.

8. The information processing apparatus according to claim 1, wherein the one or more processors further functioning as the following units
an input accepting unit configured to accept an input value that corresponds to an operation performed by an operator,
wherein the number of key frames that are set by the setting unit depends on an input value accepted by the input accepting unit.

9. The information processing apparatus according to claim 1,
wherein a first mode in which the method is determined by the determination unit, and a second mode in which the method is determined by selection made by an operator are provided, the first mode and the second mode being switchable.

10. The information processing apparatus according to claim 1, wherein the one or more processors further functioning as the following unit
a generation unit configured to generate a virtual viewpoint image based on the viewpoint information output by the output unit, and the images of the image capture region.

11. The information processing apparatus according to claim 1, wherein the one or more processors further functioning as the following unit
a display control unit configured to display a screen for editing the moving path of the virtual viewpoint.

12. The information processing apparatus according to claim 11,
wherein the display control unit displays the screen that includes marks indicating the key frames, and a mark indicating the moving path of the virtual viewpoint in a different aspect depending on the method.

13. The information processing apparatus according to claim 1,
wherein the determination unit determines the method based on whether or not
change amounts in a state of the virtual viewpoint before and after a third key frame, whose time is between a time corresponding to the first key frame and a time corresponding to the second key frame, meet the predetermined condition.

14. The information processing apparatus according to claim 13,
wherein the change amounts are per time change amounts in the state of the virtual viewpoint before and after the third key frame.

15. The information processing apparatus according to claim 13,
wherein the first method is a method for generating the moving path by changing a time corresponding to the third key frame and interpolating a virtual viewpoint among the first key frame, the second key frame and the third key frame, and
the second method is a method for generating the moving path by interpolating a virtual viewpoint among the first key frame, the second key frame and the third key frame without changing the time corresponding to the third key frame.

16. The information processing apparatus according to claim 13,
wherein the first method is a method for generating the moving path by changing the number of frames between the third key frame and a key frame adjacent to the third key frame and interpolating a virtual viewpoint among the first key frame, the second key frame and the third key frame, and
the second method is a method for generating the moving path by interpolating a virtual viewpoint among the first key frame, the second key frame and the third key frame without changing the number of frames.

17. The information processing apparatus according to claim 13,
wherein the determination unit determines the first method in a case where a difference between the change amounts is equal to or larger than a threshold, and determines the second method in a case where the difference is smaller than the threshold.

18. An information processing method comprising:
setting a plurality of key frames that each indicate a position of a virtual viewpoint that corresponds to a virtual viewpoint image generated based on images of an image capture region captured by a plurality of image capturing apparatuses from different directions;
determining, as a method for determining a moving path of a virtual viewpoint between a first key frame set in the setting and a second key frame set in the setting, a first method in a case where a position of a virtual viewpoint indicated by the first key frame and a position of a virtual viewpoint indicated by the second key frame meet a predetermined condition, and determining, as the method, a second method different from the first method in a case where the position of the virtual viewpoint indicated by the first key frame and the position of the virtual viewpoint indicated by the second key frame do not meet the predetermined condition; and
outputting viewpoint information that indicates the determined moving path of the virtual viewpoint determined based on the method determined in the determining.

19. The information processing method according to claim 18,
wherein the plurality of set key frames each indicate the position of a virtual viewpoint and orientation of view from a virtual viewpoint,
the determined method is a method for determining transition of an orientation of view from a virtual viewpoint between the first key frame and the second key frame, and
the viewpoint information that is output indicates the moving path of the virtual viewpoint, and the transition of the orientation of view from the virtual viewpoint.

20. A non-transitory computer readable storage medium storing a program for causing a computer to execute the information processing method comprising:
setting a plurality of key frames that each indicate a position of a virtual viewpoint that corresponds to a virtual viewpoint image generated based on images of an image capture region captured by a plurality of image capturing apparatuses from different directions;
determining, as a method for determining a moving path of a virtual viewpoint between a first key frame set in the setting and a second key frame set in the setting, a first method in a case where a position of a virtual viewpoint indicated by the first key frame and a position of a virtual viewpoint indicated by the second key frame meet a predetermined condition, and determining, as the method, a second method different from the first method in a case where the position of the virtual viewpoint indicated by the first key frame and the position of the virtual viewpoint indicated by the second key frame do not meet the predetermined condition; and
outputting viewpoint information that indicates the determined moving path of the virtual viewpoint determined based on the method determined in the determining.

* * * * *